United States Patent
Yang et al.

(10) Patent No.: US 9,741,396 B2
(45) Date of Patent: Aug. 22, 2017

(54) CONVERTING APPARATUS, CONTENTS CONVERTING METHOD, AND COMPUTER READABLE RECORDING MEDIUM

(71) Applicants: SAMSUNG ELECTRONICS CO., LTD., Suwon-si (KR); Gangneung-wonju National University Industry Academy Cooperation Group, Gangneung-si (KR)

(72) Inventors: Jong-ho Yang, Yongin-si (KR); Bong-gil Bak, Suwon-si (KR); Sung-wook Park, Gangneung-si (KR)

(73) Assignees: SAMSUNG ELECTRONICS CO., LTD., Suwon-si (KR); Gangneung-wonju National University Industry Academy Cooperation Group, Gangneung-si (KR)

(*) Notice: Subject to any disclaimer, the term of this patent is extended or adjusted under 35 U.S.C. 154(b) by 52 days.

(21) Appl. No.: 14/716,157

(22) Filed: May 19, 2015

(65) Prior Publication Data
US 2015/0334343 A1    Nov. 19, 2015

Related U.S. Application Data

(60) Provisional application No. 62/000,149, filed on May 19, 2014.

(30) Foreign Application Priority Data

Apr. 8, 2015  (KR) .................. 10-2015-0049831

(51) Int. Cl.
*H04N 5/92* (2006.01)
*G11B 27/28* (2006.01)
(Continued)

(52) U.S. Cl.
CPC ............. *G11B 27/28* (2013.01); *H04N 5/76* (2013.01); *H04N 5/92* (2013.01);
(Continued)

(58) Field of Classification Search
CPC ........ G06F 17/30817; G11B 2220/235; G11B 20/1217; H04N 21/4325; H04N 21/4402; H04N 5/85
See application file for complete search history.

(56) References Cited

U.S. PATENT DOCUMENTS

| 2003/0112258 A1* | 6/2003 | Dietz | .................... G06F 3/0481 715/700 |
| 2004/0261096 A1* | 12/2004 | Matz | ...................... H04N 7/163 725/28 |

(Continued)

FOREIGN PATENT DOCUMENTS

| KR | 1020140057659 A | 5/2014 |
| WO | 2013036451 A1 | 3/2013 |

OTHER PUBLICATIONS

Search Report issued Aug. 5, 2015, issued by the International Searching Authority in counterpart International Patent Application No. PCT/KR2015/004964 (PCT/ISA/210).

(Continued)

*Primary Examiner* — Huy T Nguyen
(74) *Attorney, Agent, or Firm* — Sughrue Mion, PLLC

(57) ABSTRACT

A contents converting apparatus, a contents converting method, and a computer readable recording medium are provided. The contents converting apparatus is for converting contents including a plurality of stream data and stored in a Blu-ray disc. The contents converting apparatus includes a controller configured to receive manifest information of a data structure configuring the contents, and determine stream data to be copied from the Blu-ray disc based on the manifest information. The convents converting (Continued)

apparatus further includes a formatter configured to convert the determined stream data of a first format to new stream data of a second format.

21 Claims, 22 Drawing Sheets

(51) Int. Cl.
  *H04N 5/76* (2006.01)
  *H04N 21/426* (2011.01)
  *H04N 21/4402* (2011.01)
  *H04N 21/4627* (2011.01)
  *H04N 21/8355* (2011.01)

(52) U.S. Cl.
  CPC ... *H04N 21/42646* (2013.01); *H04N 21/4402* (2013.01); *H04N 21/4627* (2013.01); *H04N 21/8355* (2013.01)

(56) References Cited

U.S. PATENT DOCUMENTS

| | | | |
|---|---|---|---|
| 2006/0090030 A1* | 4/2006 | Ijdens | G11B 20/10 711/111 |
| 2006/0271599 A1* | 11/2006 | Yamamoto | G06F 17/30017 |
| 2009/0288076 A1 | 11/2009 | Johnson et al. | |
| 2012/0023251 A1 | 1/2012 | Pyle et al. | |
| 2012/0033944 A1 | 2/2012 | Hattori et al. | |
| 2013/0060911 A1 | 3/2013 | Nagaraj et al. | |
| 2013/0311780 A1 | 11/2013 | Besehanic | |

OTHER PUBLICATIONS

Written Opinion issued Aug. 5, 2015, issued by the International Searching Authority in counterpart International Patent Application No. PCT/KR2015/004964 (PCT/ISA/237).

Communication dated Nov. 30, 2015, issued by the Korean Intellectual Property Office in counterpart Korean Application No. 10-2015-0049831.

* cited by examiner

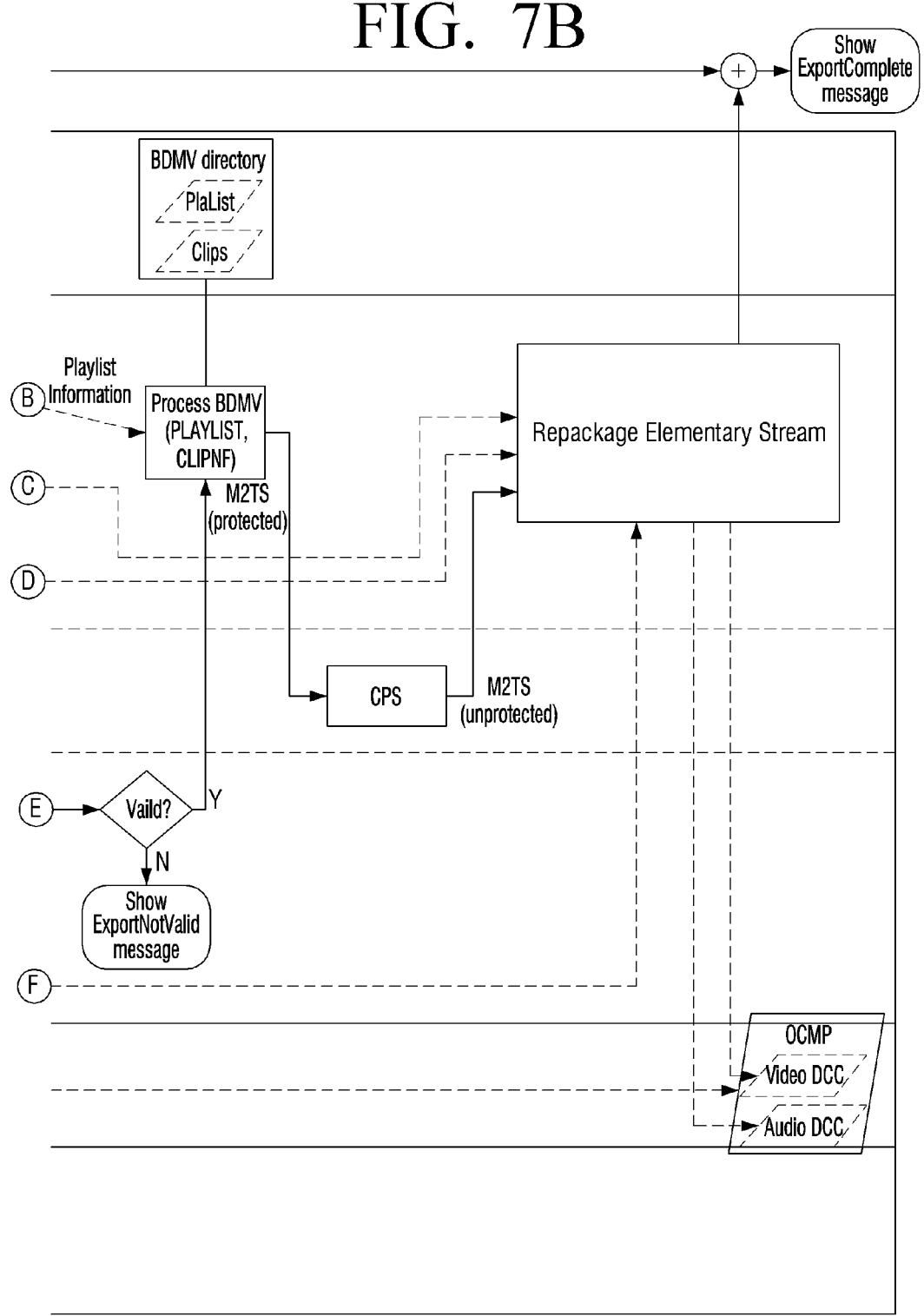

CONVERTING APPARATUS, CONTENTS CONVERTING METHOD, AND COMPUTER READABLE RECORDING MEDIUM

CROSS-REFERENCE TO RELATED APPLICATIONS

This application claims priority from Korean Patent Application No. 10-2015-0049831, filed on Apr. 8, 2015, in the Korean Intellectual Property Office, and claims the benefit under 35 U.S.C. 119(e) of U.S. Provisional Application No. 62/000,149, filed on May 19, 2014, in the U.S. Patent and Trademark Office, the entire disclosures of which are incorporated herein by reference for all purposes.

BACKGROUND

Field

Apparatuses and methods consistent with exemplary embodiments relate to a contents converting apparatus, a contents converting method, and a computer readable recording medium.

Description of the Related Art

With the development of electronic technologies, a method for consuming video contents is getting diverse. In the past, a user played video contents received from a broadcasting station or consumed video contents by connecting audiovisual (AV) devices like a video tape recorder (VTR), a digital versatile disc (DVD) player, and a Blu-ray disc (BD) player to a television (TV). Recently, a user may consume video contents using various devices such as a personal computer (PC), a smart phone, and a tablet PC. However, a lot of time and cost may be required to distribute high quality video contents through the Internet or a mobile network. Therefore, a demand has increased for a method for creating video contents from existing video contents distributing means, i.e., broadcasting, a VTR tape, a DVD, and a BD, all of which may be used in the devices such as the PC, the smart phone, and the tablet PC.

To generate contents of types that may be copied and may be consumed in the PC, the smart phone, the tablet PC, etc., when the DVD or the BD are the existing video contents distributing means and have contents recorded in a digital scheme, analog digital conversion (ADC) and AV compression are not required, and therefore the contents may be copied at low cost. However, a typical digital file copying method has a problem in that video contents may not be perfectly copied.

The typical digital file copying method copies all bits of information recognized as a file to make the same information as original information exist in a destination. Generally, an example of the typical digital file copying method may include a file copying method in a PC.

Even though contents look to a user as a title unit in the Blu-ray disc, stream files like a video, an audio, a sub-picture, a text-subtitle, a BD Java code, an image, etc., a navigation file instructing a method for playing a stream, and a file like metadata having a description regarding a disc, are present in an actual disc. That is, a title looks like a kind of data playing item to the user, and data that are used for actual playing become a portion or all of the stream files or a plurality of stream files. Therefore, the Blu-ray disc video contents correspond to compound digital contents, which are analyzed and played along with the stream files, like the video, the audio, the sub-picture, the text-subtitle, the BD Java code, and the image, and the navigation file. Therefore, a need exists for a contents converting method that converts content into a format that may be played in the PC, the smart phone, and the like, not merely a format that may be copied.

FIG. 1 is a diagram illustrating a relationship between a media file and a navigation information structure that are stored in a Blu-ray disc. The information structure is of video contents stored in the Blu-ray disc. Compound digital contents are stored in the Blu-ray disc, and a method for playing the same is determined by a movie object, a BD-J object, a Play List, a Play Item, and the like, which are navigation data.

FIG. 2 is a diagram illustrating a directory and a file structure of a Blu-ray disc. The directory is from a viewpoint of files. Here, a playing method means a file to be played, a playing scope within the file, a playing order of the playing scope, and the like. The BD-J object may include the playing method and applications, e.g., being displayed on a screen or controlling the Blu-ray player.

Therefore, there is a problem in that when the compound digital contents are copied only by the directory and a file name of FIG. 2 without understanding of the navigation data as illustrated in FIG. 1 (a file copying method), only a portion of an original title may be copied, or too much data may be copied. Therefore, a technology of understanding a navigation structure to export a title is needed.

FIG. 3 is a diagram illustrating a case in which one content consists of a plurality of files. In this case, Clip 1 and Clip 2 are stored as separate files, and therefore when only one of the Clip 1 and the Clip 2 is copied, it is impossible to perfectly play a video title. Further, even though the two files are copied, if Movie PlayList, which is a portion of the navigation data, is not understood and the files are copied by the existing method, it may not be understood what portion of any file needs to be played in what order, at a time of playing the files.

Further, to select and copy only some streams of one compound digital content that is stored in the Blu-ray disc, the streams may not be copied by the existing file copying method. A plurality of audio and graphic subtitles that are included in one video are contained in the Blu-ray disc contents while being multiplexed. However, some of the audio are not lines but may be an audio for describing a movie of a director, and some of the graphic subtitles may also be stored with graphics for a special use, which are not subtitles. Therefore some of the audio and some of the graphic subtitles may not be selectively copied even if not required. Therefore, in the case of the compound digital contents, a function of enabling a user to select and export only his/her desired contents is needed.

The plurality of compound digital contents (a plurality of titles) are generally present in the Blu-ray disc. However, a user may have trouble figuring out what title is present in the disc without playing a menu title, and therefore may have trouble determining what title needs to be exported without playing the Blu-ray disc. Therefore, separate information (for example, information needed to configure a menu helping the user to select his/her desired contents) helping the user to assort and export specific videos is needed.

In the case of converting and exporting contents, one stream for each kind is not exported, but there is a need to export a plurality of streams. However, to export the plurality of streams at a time, there is a need to change an existing decoder structure, and therefore there is a problem in that manufacturers need to correct a decoder chip on the whole. Therefore, an information structure and a method for exporting only one kind of stream or a plurality of streams in response to performance of a device need to be provided.

When converting the digital contents that are stored in the Blu-ray disc into a format that may be used in the devices such as the PC, the smart phone, the tablet PC, and the like, an International Organization for Standardization (ISO) base media file format (ISO BMFF) has been mainly used as a file format finally stored. The reason why the ISO BMFF format is mainly used is that the ISO BMFF has been supported by information technology (IT) devices over a long period of time, and as a result, there are many devices that may read the format. Further, MPEG-2 and MPEG-4 video decoders, MPEG4 Advanced Audio Coding (AAC) audio decoder, and the like are mainly supported in the PC, the smart phone, and the tablet, and the like, and therefore the contents having the ISO BMFF may be played in many devices. However, the compound digital contents that are stored in the Blu-ray disc may support the MPEG-2, the MPEG-4, and VC-1 in the case of the video, and therefore may be played in the IT devices without a big problem. However, the compound digital contents may support a high quality audio having AC-3, meridian lossless packing (MLP), and digital theater system (DTS) format in the case of the audio, such that the compound digital contents may not be played by the typical IT devices. Therefore, when converting and outputting the compound digital contents in the Blu-ray disc, a function of creating final results by adding contents that are not present in the original disc is needed. As such, it is possible to keep playing compatibility of converted results in more IT devices by a function of adding third contents.

Generally, the contents of the Blu-ray disc are protected by an advanced access content system (AACS). In the case of converting the contents protected by the AACS into other media and exporting and transmitting the converted contents, the contents are generally protected by a new contents protective system. Therefore, a process of releasing a code of the contents that are stored in the Blu-ray disc and coded, and encrypting the contents based on a new protective system scheme, is needed. In this case, an encryption key for new encryption is needed. A method for safely protecting the key is needed.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a contents converting apparatus, a contents converting method, and a computer readable recording medium capable of defining a conversion scheme that understands a navigation structure, a conversion scheme that selects and exports a portion of compound digital contents, an information structure that helps a user to select and export his/her desired title from a plurality of titles, an information structure that implements a conversion function in a player which has a decoder structure processing one kind of stream at a time, an information structure that secures and adds contents, which are not present in an original disc, at another position, and an information structure that safely protects an encryption key used in a conversion process, and using the same.

According to an aspect of an exemplary embodiment, there is provided a contents converting apparatus for converting contents including a plurality of stream data and stored in a Blu-ray disc, the contents converting apparatus including a controller configured to receive manifest information of a data structure configuring the contents, and determine stream data to be copied from the Blu-ray disc based on the manifest information. The contents converting apparatus further includes a formatter configured to convert the determined stream data of a first format to new stream data of a second format.

The controller may be configured to receive address information from the Blu-ray disc, and receive the manifest information from a server corresponding to the address information.

The controller may be configured to receive a contents identifier (ID) of the contents stored in the Blu-ray disc from the Blu-ray disc, and receive the manifest information corresponding to the contents ID from a server.

The controller may be configured to receive the manifest information from the Blu-ray disc.

The contents converting apparatus may further include a display unit configured to display a screen, and the controller may be configured to control the display unit to display one or more offers to convert the respective plurality of stream data based on the manifest information, and determine a stream data corresponding to a selection of one of the one or more offers as the stream data to be copied.

The second format may include an International Organization for Standardization base media file format definition file or a media extraction table.

The formatter may be further configured to encrypt the new stream data.

The formatter may be configured to combine the determined stream data with stream data received from a server to generate the new stream data.

According to an aspect of an exemplary embodiment, there is provided a contents converting method for converting contents including a plurality of stream data and stored in a Blu-ray disc, the contents converting method including receiving manifest information of a data structure configuring the contents, and determining stream data to be copied from the Blu-ray disc based on the manifest information. The contents converting method further includes converting the determined stream data of a first format to new stream data of a second format.

The receiving may include receiving address information from the Blu-ray disc, and receiving the manifest information from a server corresponding to the address information.

The receiving may include receiving a contents identifier (ID) of the contents stored in the Blu-ray disc from the Blu-ray disc, and receiving the manifest information corresponding to the contents ID from a server.

The receiving may include receiving the manifest information from the Blu-ray disc.

The determining may include displaying one or more offers to convert the respective plurality of stream data based on the manifest information, and determining a stream data corresponding to a selection of one of the one or more offers as the stream data to be copied.

The contents converting method may further include encrypting the new stream data.

The manifest information may include any one or any combination of offer introduction information of the stream data to be copied, key information to be used to encrypt the stream data to be copied, and copy information, and the copy information may include any one or any combination of navigation information, stream information, positional information of stream data, and protocol information to be used to access the stream data.

The manifest information may include copy priority information indicating a priority based on a user preference.

The converting may include combining the determined stream data with stream data received from a server to generate the new stream data.

The stream data received from the server may be any one or any combination of a subtitle, a video, an audio, and a text.

A non-transitory computer readable recording medium may store a program including instructions to cause a computer to perform the method.

According to an aspect of an exemplary embodiment, there is provided a contents converting apparatus including a display unit, and a controller configured to control the display unit to display one or more offers to convert respective streams, and select a stream from the streams based on an input. The contents converting apparatus further includes a formatter configured to convert the selected stream of a content format to a new stream of a common media package format.

The controller may be further configured to receive the one or more offers from either one or both of the streams and a server.

The controller may be further configured to request a server to authorize the selected stream, and the formatter may be configured to convert the selected stream to the new stream in response to an authorization of the selected stream being received from the server.

BRIEF DESCRIPTION OF THE DRAWING

The above and/or other aspects will be more apparent by describing certain exemplary embodiments with reference to the accompanying drawings, in which:

FIGS. 7A to 7C are diagrams illustrating a Blu-ray disc movie format (BDMV) Export operation of a contents converting method according to an exemplary embodiment;

DETAILED DESCRIPTION OF THE EXEMPLARY EMBODIMENTS

Figure 1:
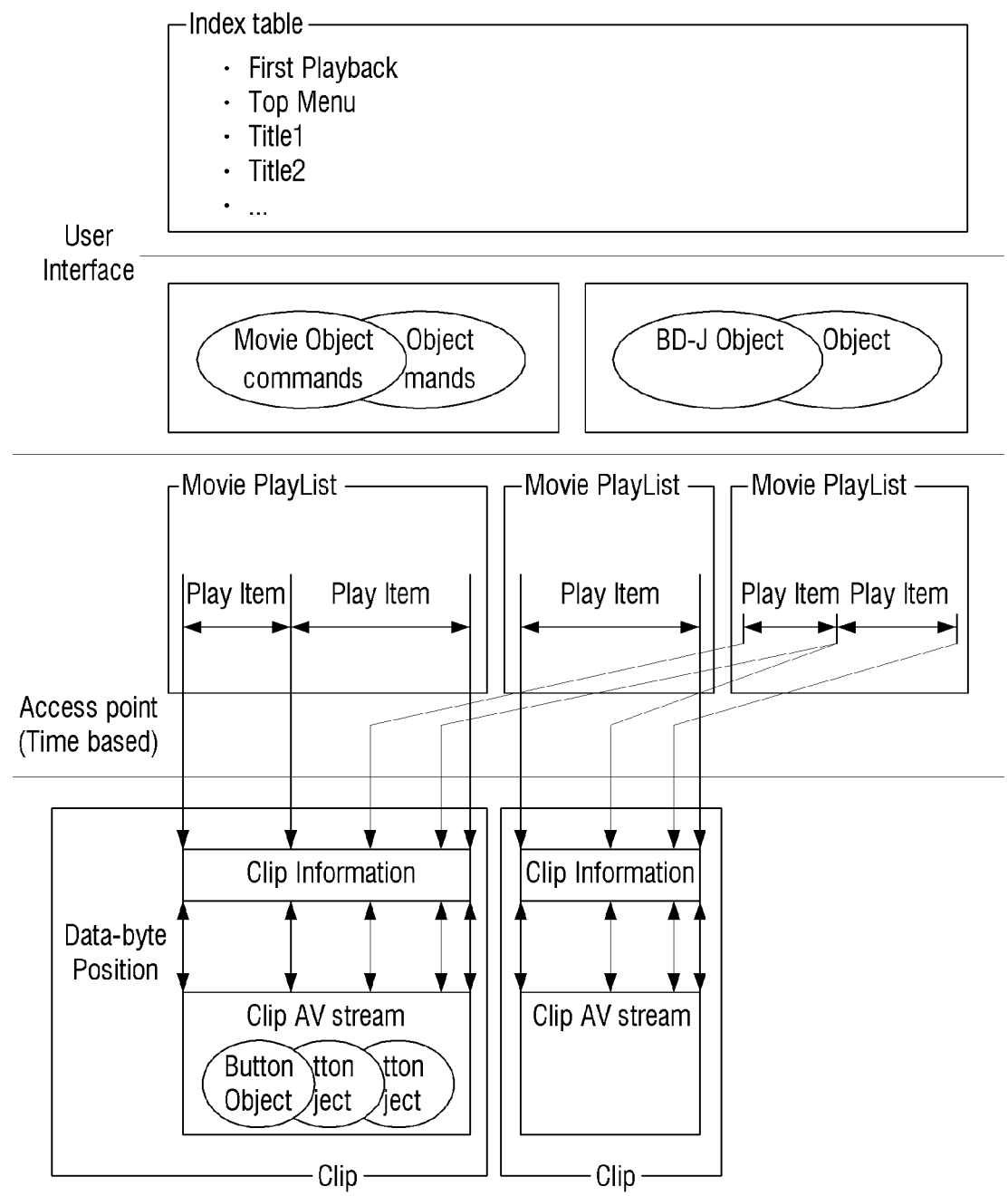
FIG. 1 is a diagram illustrating a relationship between a media file and a navigation information structure that are stored in a Blu-ray disc.
Figure 2:
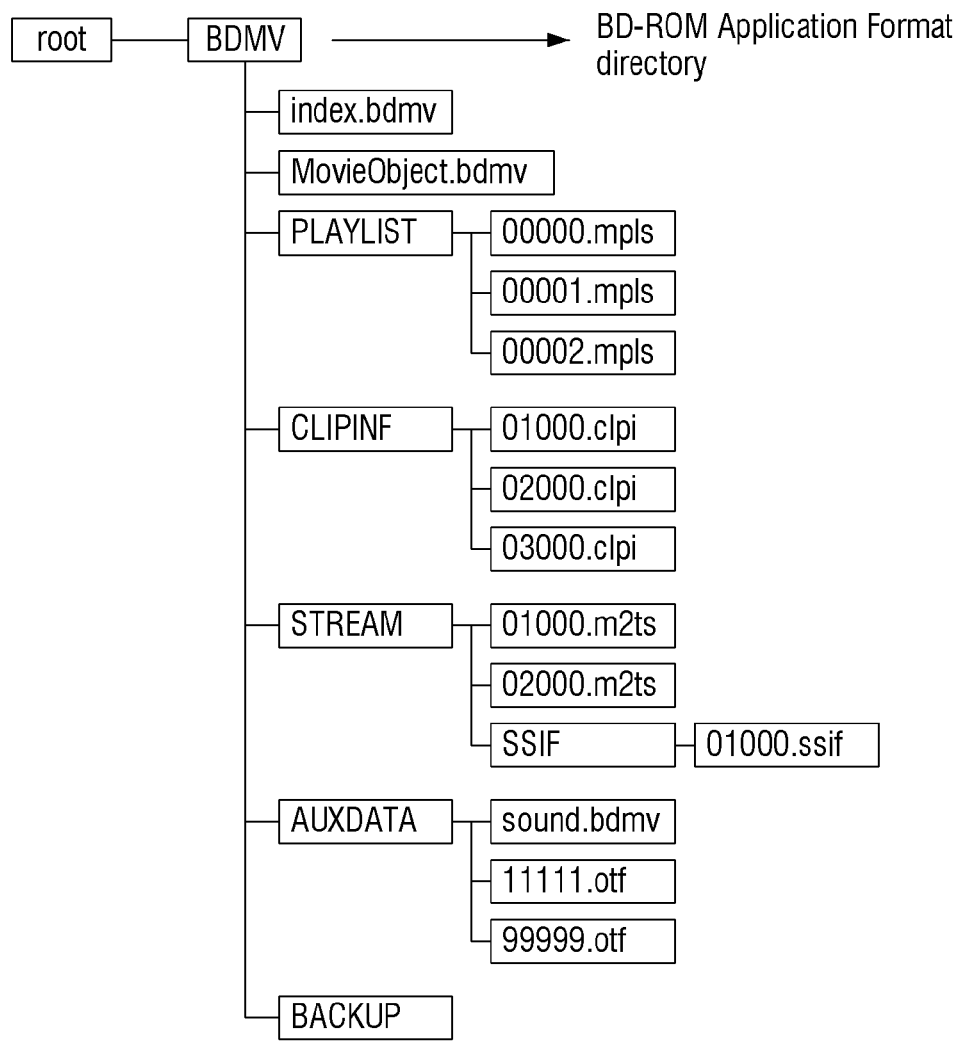
FIG. 2 is a diagram illustrating a directory and a file structure of a Blu-ray disc.
Figure 3:
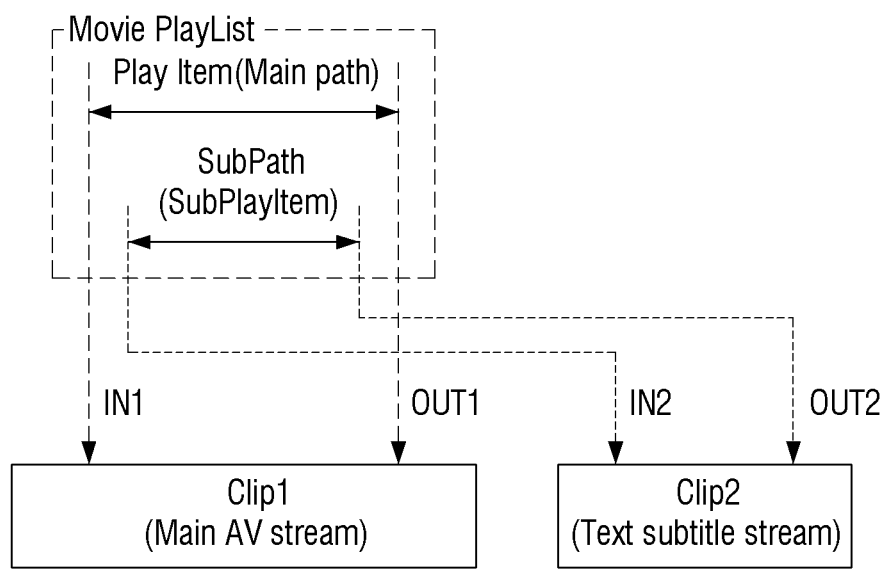
FIG. 3 is a diagram illustrating a case in which one content consists of a plurality of files.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

A contents converting method according to an exemplary embodiment may be a common media package (CMP) Export. The CMP Export means that a contents converting apparatus, such as a Blu-ray disc player, converts data encoded into a Blu-ray disc movie (BDMV) format into a CMP file format along with additional data for export (DfE). A CMP file may be used in another digital ecosystem. For example, the CMP file may have a format that may be executed in a personal computer PC, such as International Organization for Standardization (ISO) and Audio Video Interleaved (AVI) formats.

Figure 4:
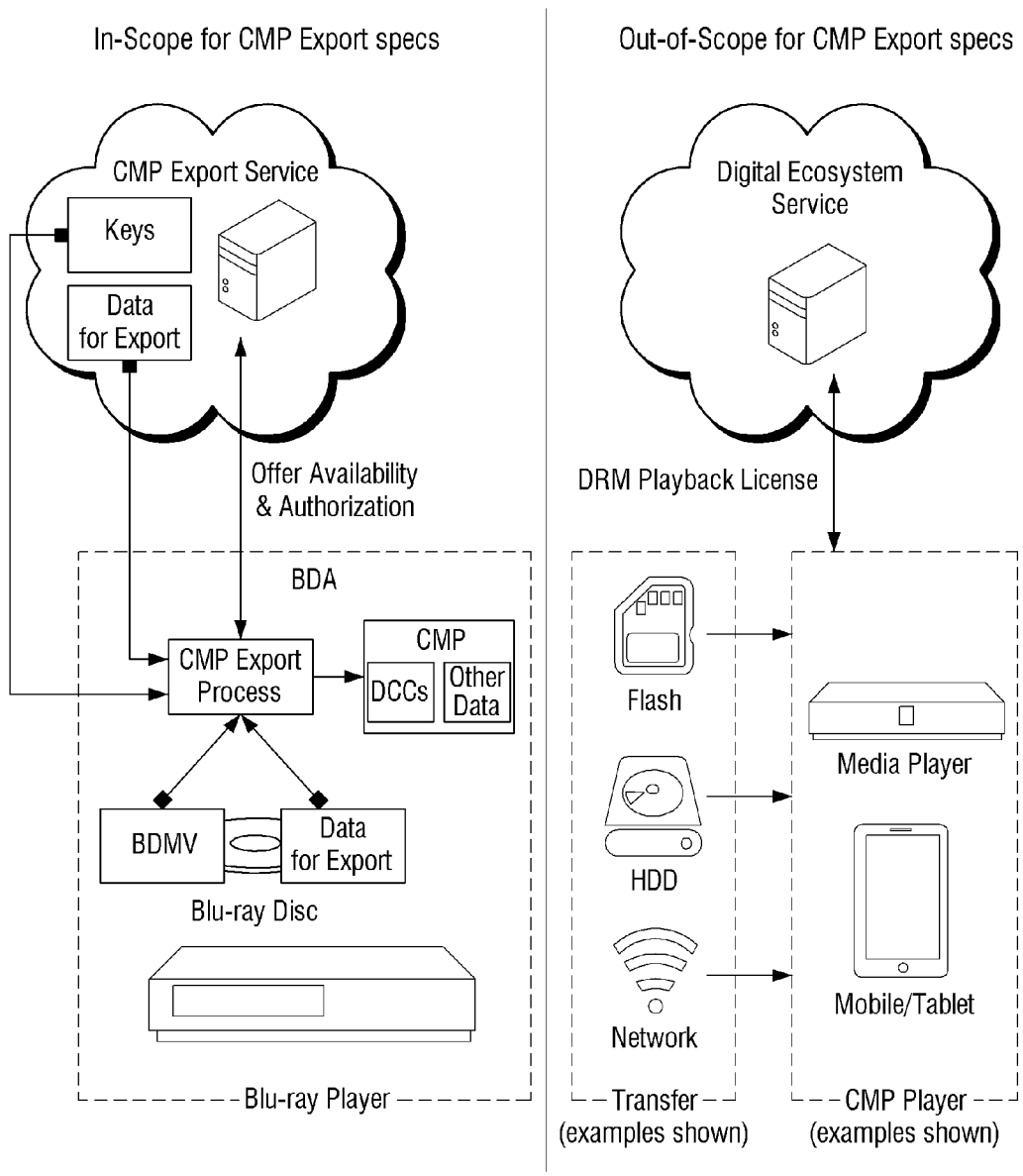
FIG. 4 is a conceptual diagram of a contents converting method according to an exemplary embodiment.

FIG. 4 is a conceptual diagram of a contents converting method according to an exemplary embodiment. The contents converting method is represented by a CMP Export. A Blu-ray player, which is a kind of a contents converting apparatus, obtains contents and data from a Blu-ray disc. The contents are in the BDMV format, and the data may include DfE. Further, the contents converting apparatus may obtain information needed to convert and export contents from a server or a CMP Export service. The information may include keys, DfE, and/or an availability and an authorization of the information that is offered by the server. The contents converting apparatus may receive the contents, data, and information, and convert the contents, data, and information to new stream data or a CMP file in a CMP format. For example, the CMP file may be in an ISO base media file format definition file (ISODF) or media extraction table (MET) format.

The new stream data may be transmitted to devices that may play the CMP file through an external storage device or a network. The external storage device may include a transfer device such as, for example, a flash memory and a hard disk drive (HDD). The devices that may play the CMP file may include CMP players such as, for example, a media player, a mobile device, and a tablet PC. For example, a user may store video contents exported as the CMP file in a flash memory, and transmit the stored video contents to another user. In another example, the user may upload the exported video contents onto a network attached storage (NAS) device to enable users who may access the NAS device to use the video contents.

However, the CMP file may need to be verified by a digital ecosystem service as to whether a user has a digital rights management (DRM) playback license to play the CMP file, to prevent unauthorized hacking. An encryption process further preventing unauthorized hacking will be described below.

According to the contents converting method according to the exemplary embodiment, a user may transmit high quality contents from a content converting apparatus to other users or other apparatuses for playing contents. From a viewpoint of content manufacturers, it is possible to spread contents to various digital ecosystems without intervention of the manufacturers.

Figure 5:
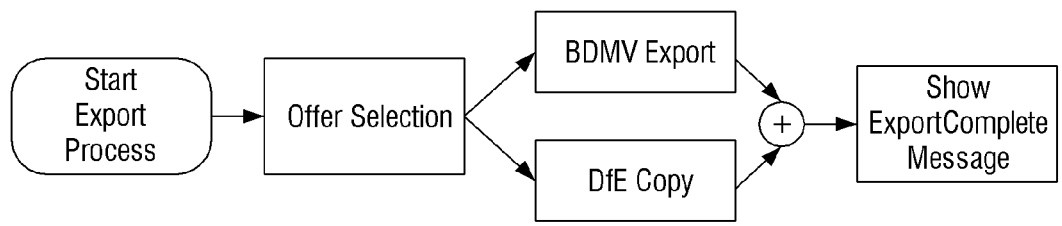
FIG. 5 is a diagram illustrating a process of a contents converting method according to an exemplary embodiment.

FIG. 5 is a diagram illustrating a process of a contents converting method according to an exemplary embodiment. Referring to FIG. 5, a CMP Export process includes three operations: an Offer Selection, a BDMV Export, and a DfE Copy. Contents included in a Blu-ray disc that go through the Offer Selection, BDMV Export, and DfE Copy are converted into a CMP file that may be played in information technology (IT) devices.

In detail, the Offer Selection is a process of obtaining manifest information, allowing a user to select contents that are converted and exported, and authenticating the contents for export. Next, the BDMV Export is a process of converting and exporting data encoded into the BDMV format into the CMP file. Finally, the DfE Copy is a process of copying contents of which a format need not be converted, by a file copying method.

As illustrated in FIG. 5, the BDMV Export and the DfE Copy may be performed in parallel. Further, any one of the BDMV Export and the DfE Copy may be first performed.

In summary, the contents converting apparatus in the Offer Selection obtains the manifest information to allow a user to select a stream to be exported, and authenticates the contents to export the selected stream. For the stream of which a format conversion is needed, in the BDMV Export, the contents converting method according to the exemplary embodiment is applied to convert the stream to a CMP file prior to being exported. On the other hand, in the DfE Copy, contents that may be copied by the existing file copying method are copied. The converted stream and/or the contents that may be copied are merged and exported. The contents converting apparatus may show an Export Complete message indicating that the export is complete.

Further, the selected stream and the CMP file need to have a one-to-one correlation. That is, when one stream is selected to be exported, if the conversion is successfully performed, one CMP file needs to be exported.

The three operations illustrated in FIG. 5 will be described in detail with reference to FIGS. 6A to 8.

Figure 6A:
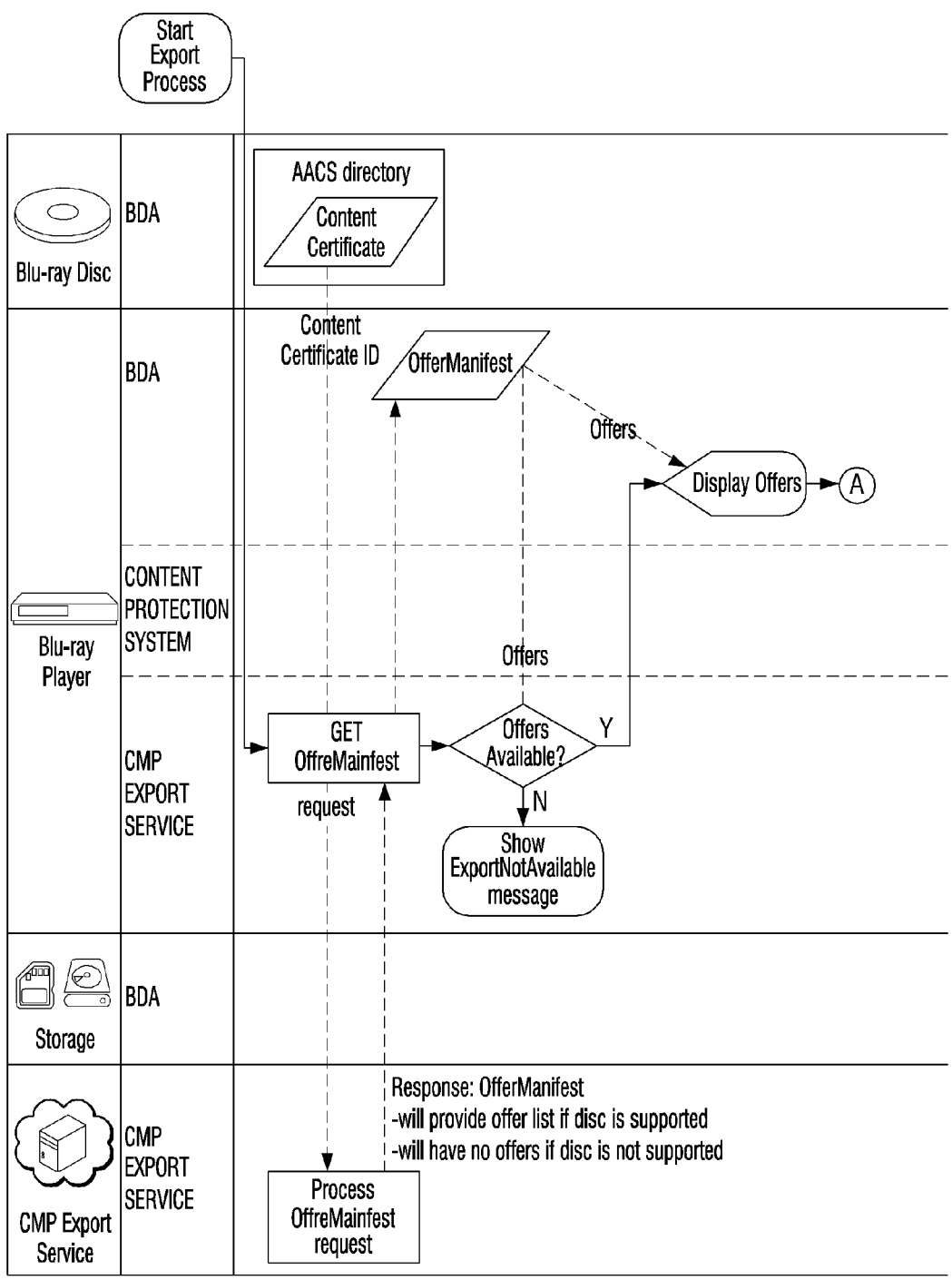
FIGS. 6A and 6B are diagrams illustrating an Offer Selection operation of a contents converting method according to an exemplary embodiment.
Figure 6B:
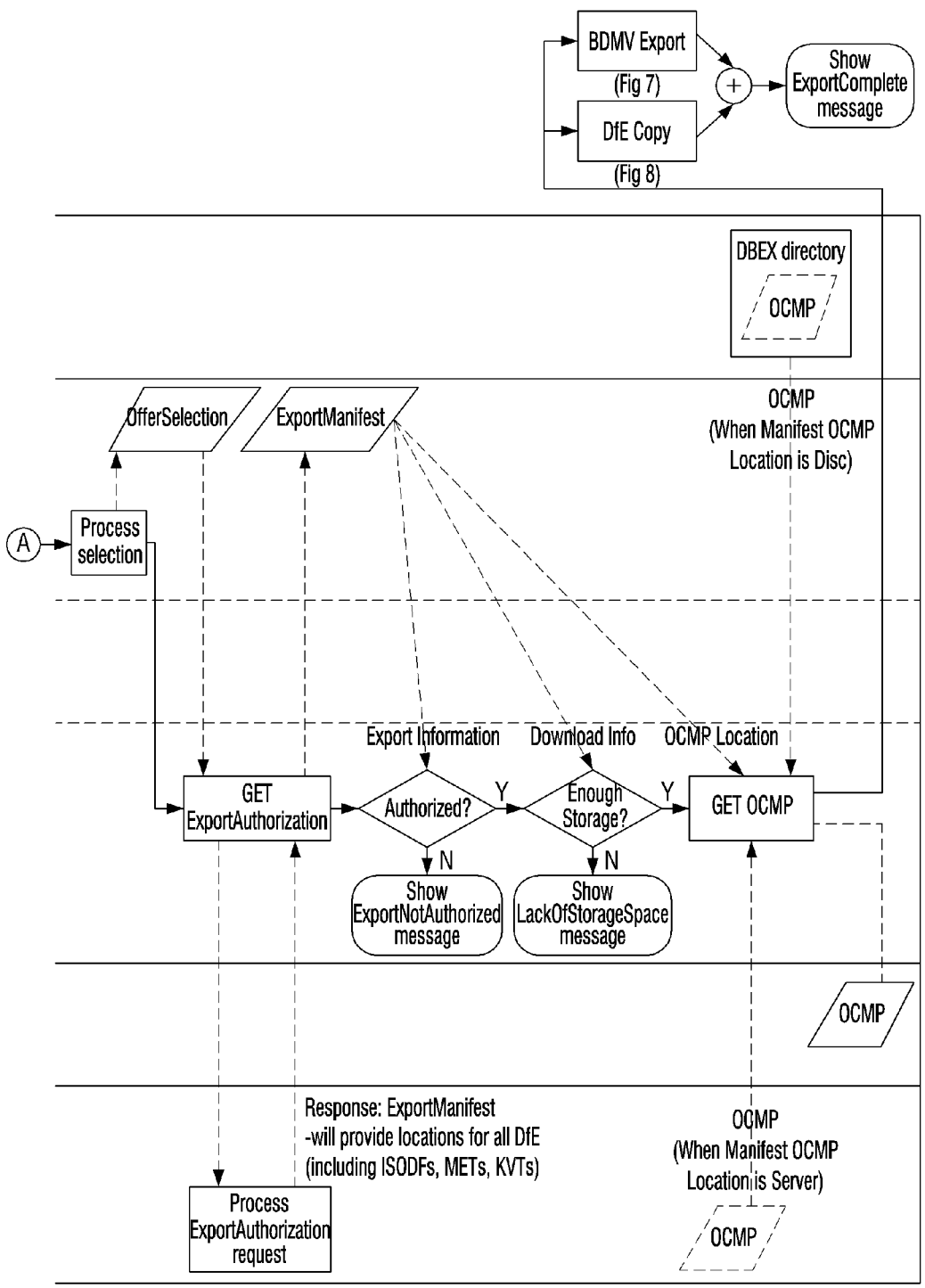

FIGS. 6A and 6B are diagrams illustrating an Offer Selection operation of a contents converting method according to an exemplary embodiment. In FIGS. 6A and 6B, a solid line means a process progress, and a dashed line means a data transmission. First, when starting a CMP Export process, an operation of acquiring Offer Manifest information is performed. In detail, a contents converting apparatus or Blu-ray player acquires a content certificate identifier (ID) stored in an advanced access content system (AACS) directory of a Blu-ray disc, transmits the acquired content certificate ID to a server or CMP export service as a request for the Offer Manifest information, and receives the corresponding Offer Manifest information from the server. The Offer Manifest information may include information helping the contents converting apparatus to provide a CMP Export option to a user if the Blu-ray disc is supported. The Offer Manifest information may include Offer Selection information and Export Manifest information, which will be described later.

Next, the contents converting apparatus determines whether there are selectable offers available to be displayed for respective contents, based on the acquired Offer Manifest information. The selectable offers are expressed by Offers. When there are no selectable offers available, the contents converting apparatus shows a message that indicates that an export is not available. The message is called 'ExportNotAvailable Message', and contents of the message may be defined in the server. On the contrary, when there are selectable offers available, the contents converting apparatus displays the selectable offers based on the acquired Offer Manifest information. The user may select, via the contents converting apparatus, contents that are to be converted and exported, based on the displayed offers. Alternatively, the selection of the displayed offers may also be performed by predetermined information, without an input of a user command.

When the selection of the user or the selection by the predetermined information is made, the contents converting apparatus generates mandatory export data, default export data that has not been overridden by the user, and the Offer Selection information that includes the contents selected by the user to be exported. The Offer Selection information is generated to define a file list to be included in the CMP file.

The contents converting apparatus provides the Offer Selection information to the server as an Export Authorization request. The server processes the request, and provides, to the contents converting apparatus, the Export Manifest information corresponding to the Offer Selection information. The Export Manifest information indicates whether the export requested by the Offer Selection information is authorized. The server may also provide locations for all DfE, ISODFs, METs, and the like.

The contents converting apparatus determines whether the export requested by the Offer Selection information is authorized based on the Export Manifest information received from the server. If the export is determined to not be authorized, the contents converting apparatus shows a message that indicates that the export is not authorized. The message is called 'ExportNotAuthorized Message', and contents of the message may be defined in the server.

On the contrary, if the export is determined to be authorized, the contents converting apparatus determines whether there is a sufficient storage space in which the exported CMP file may be stored. If it is determined that there is insufficient storage space, the contents converting apparatus shows a message that indicates that the storage space is insufficient. The message is called 'LackOfStorageSpace Message', and contents of the message may be defined in the server.

If it is determined that there is the sufficient storage space, the contents converting apparatus retrieves an original CMP (OCMP) from a position specified in the Export Manifest information. The OCMP may be stored in parallel with BDMV contents in the Blu-ray disc, or in an URL supported by the server. The OCMP is stored in an internal storage unit of the contents converting apparatus or an external storage unit connected to the contents converting apparatus.

The Offer Manifest information, the Offer Selection information, and the Export Manifest information that configure the manifest information will be described in more detail.

The Offer Manifest information may provide a user interface (UI) by which the contents converting apparatus enables a user to select a valid offer to export content. Further, the Offer Manifest information may also inform that there is no selectable offer. The Offer Selection information expresses information of an offer that is selected by the user. The Export Manifest information includes information needed for the contents converting apparatus to perform an export operation. Each information may be defined as an XML document format.

A function of the Offer Manifest information provides information needed to generate and provide the UI for the Offer Selection. Further, a function of the Offer Manifest information captures the selected offer in a form in which the selected offer may be used in a subsequent operation of converting contents.

A CMP Export configuration that needs to be authorized by a content provider for a Blu-ray disc is called an offer. An export option that is determined depending on whether the offer is selected is called a sub-offer. The offer is 'optional', and the sub-offer may be 'required' or 'optional'. The Offer Manifest information is designed to support language localization including translation, the offer and the sub-offer, and an ability to include pre-selected default options.

The contents providing apparatus needs to provide a function of enabling a user to select or release offers. Further, the contents providing apparatus needs to start a contents converting function without the user selecting an optional sub-offer. All of primary BDMV video, default BDMV audio, and a mandatory non-BDMV stream are automatically included in the Offer Selection information. For example, when the user does not select the default BDMV audio but selects another BDMV audio stream, the Offer Selection information additionally includes the stream that is selected by the user. The Offer Selection information may be considered as a list of parts configuring the CMP file. For example, the Offer Selection information may include a list of selected video clips, audio streams, and subtitles.

The Export Manifest information provides the OCMP or part information that is downloaded from the server or needs to be exported from the Blu-ray disc. The Export Manifest information includes a direct instruction on how to appropriately configure the CMP file. However, the Export Manifest information does not specify an operation command that is to be left to the contents conversion apparatus. The information included in the Export Manifest information supports maximum flexibility in execution.

For example, as a method for generating the Export Manifest information, there may be the following two methods. However, the method for generating the Export Manifest information is not limited to the following two methods.

A first method is a method for directly generating the Export Manifest information from the Offer Selection information. It is determined where the part (for example, online DfE to be downloaded from the server, DfE exported from the Blu-ray disc, an elementary stream, and the like) for generating the CMP file comes, based on the XML document of the Offer Selection information. Further, the determined information is used in the Export Manifest information. As a result, the generated Export Manifest information is the Export Manifest information that is limited to the selected offer.

The second method starts from the Export Manifest information including information on positions of all parts, independent of whether the parts are selected. This is a method for generating the Export Manifest information as a method for removing portions other than needed portions based on the Offer Selection information. As a result, the above two methods generate the same Export Manifest information.

The Export Manifest information includes information needed to configure the CMP file. However, the Export Manifest information may not include authorization or encryption information. The export process using the Export Manifest information will be briefly described below. The OCMP is put at a targeted position, and the parts are obtained from a source specified by the Export Manifest information. Further, a ZIP directory is generated at an end of the CMP file. An order for obtaining each part is not included in the Export Manifest information, and may be freely selected depending on the contents converting apparatus for optimization.

Figure 7A:
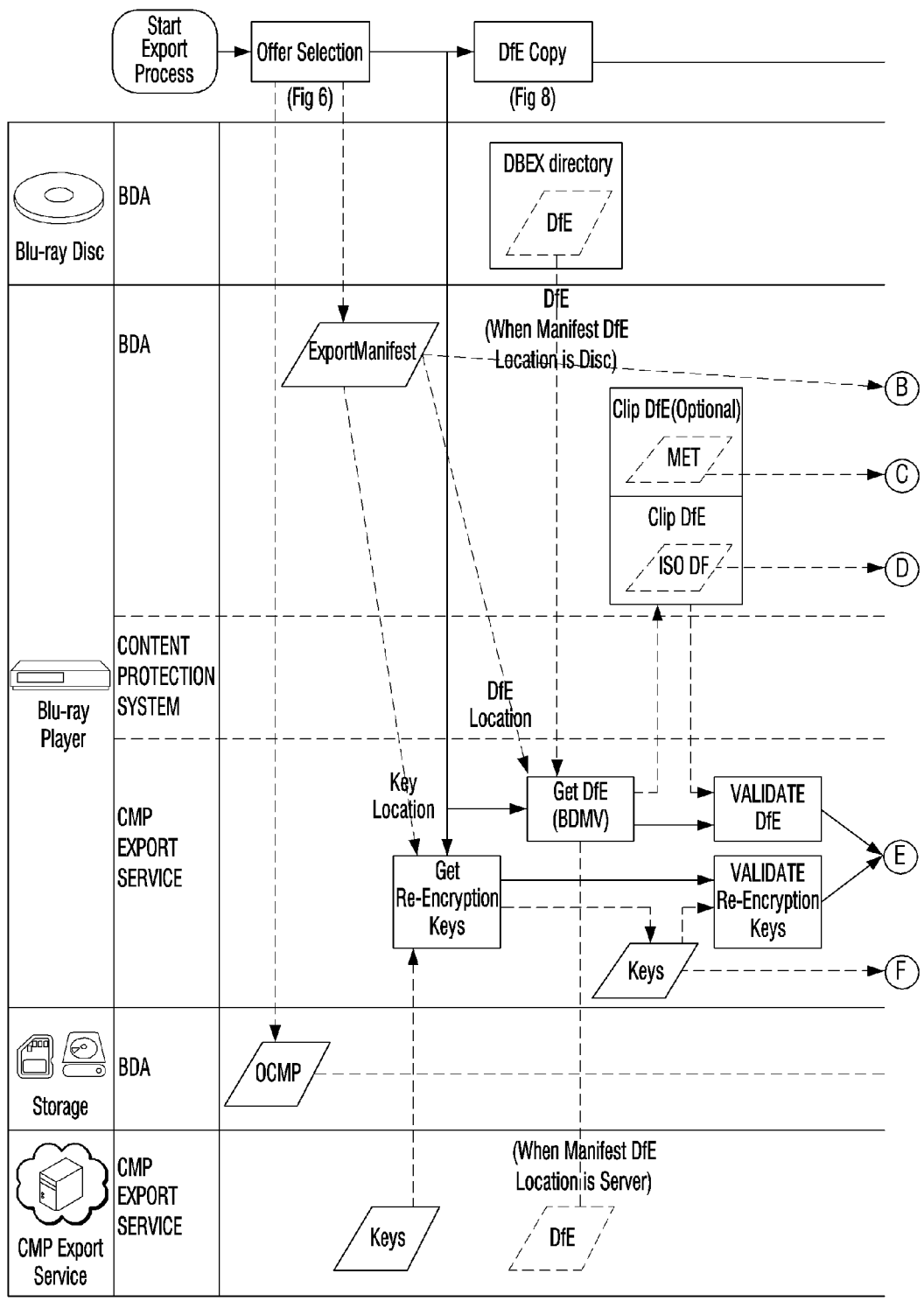
Figure 7C:
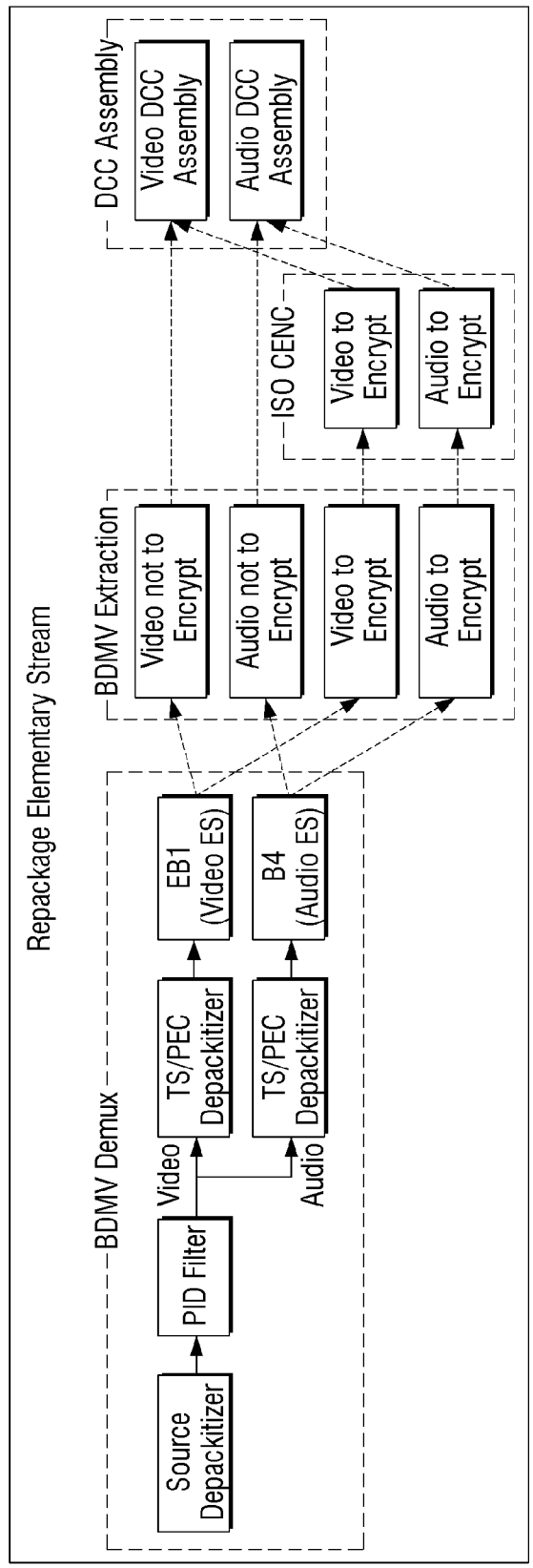

FIGS. 7A to 7C are diagrams illustrating a BDMV Export operation of a contents converting method according to an exemplary embodiment. The BDMV Export includes an operation of repackaging a stream illustrated in FIG. 7C. In FIGS. 7A to 7C, a solid line means a process progress, and a dashed line means a data transmission.

First, a contents converting apparatus or a Blu-ray player acquires a re-encryption key for elementary streams exported from a BDMV MPEG-2 Transport Stream (M2TS). To obtain the key from the server, the contents converting apparatus may use key positional or location information defined in the Export Manifest information. The re-encryption key is used to re-encrypt data encoded by the BDMV using common encryption (CENC). Next, the contents converting apparatus validates an integrity and an authenticity of the re-encryption key that agrees with requirements defined in the server.

The contents converting apparatus also acquires DfE for the elementary streams exported from the BDMV M2TS in parallel with the above-mentioned operation of acquiring the re-encryption key. To obtain the DfE, the contents converting apparatus may use the DfE positional or location information defined in the Export Manifest information. For example, the DfE may be present in BDMV contents and at the position supported by the server. The DfE may have two types. One is a MET and another is an ISODF. Next, the contents converting apparatus validates an integrity and an authenticity of the DfE that agrees with requirements defined in the server.

The contents converting apparatus determines whether an error is validated in the operation of acquiring the re-encryption key and the operation of acquiring the DfE. If an error is determined to be validated, the contents converting apparatus shows a message of contents that indicate that the export is not valid. The message is called 'ExportNotValid Message', and the contents of the message may be defined in the server.

On the contrary, if an error is not determined to be validated, the contents converting apparatus processes BDMV. In detail, the contents converting apparatus processes a related BDMV PlayList and a PlayItem (i.e., clip) from a BDMV directory to identify the elementary streams to be exported from the BDMV M2TS. The Export Manifest information defines the PlayList, the PlayItem, and PID that are to be exported. To identify a reference clip (M2TS) and the elementary streams to be exported from the clip, the contents converting apparatus parses the PlayList. Further, the contents converting apparatus performs a content protection process (CPP) to remove protection from the M2TS.

Next, the contents converting apparatus repackages an elementary stream as illustrated in FIG. 7C. In detail, the contents converting apparatus demultiplexes elementary streams from an unprotected M2TS. The exported video stream and audio stream may be stored in different buffers.

The contents converting apparatus determines which BDMV elementary streams will be exported depending on an MET procedure or an ISODF procedure. Further, the contents converting apparatus determines which data among the exported BDMV elementary streams are to be re-encrypted or not to be encrypted. Next, the contents converting apparatus performs the common encryption (CENC) on the data to be re-encrypted. After both of the export and encryption processes are performed, the contents converting apparatus copies the exported data as defined by the Export Manifest information to the ISODF.

The contents converting apparatus needs to export at least one primary audio BDMV encoded audio stream from a BDMV encoded M2TS. Further, the contents converting apparatus needs to export a primary video BDMV encoded video stream from the BDMV encoded M2TS.

Figure 8:
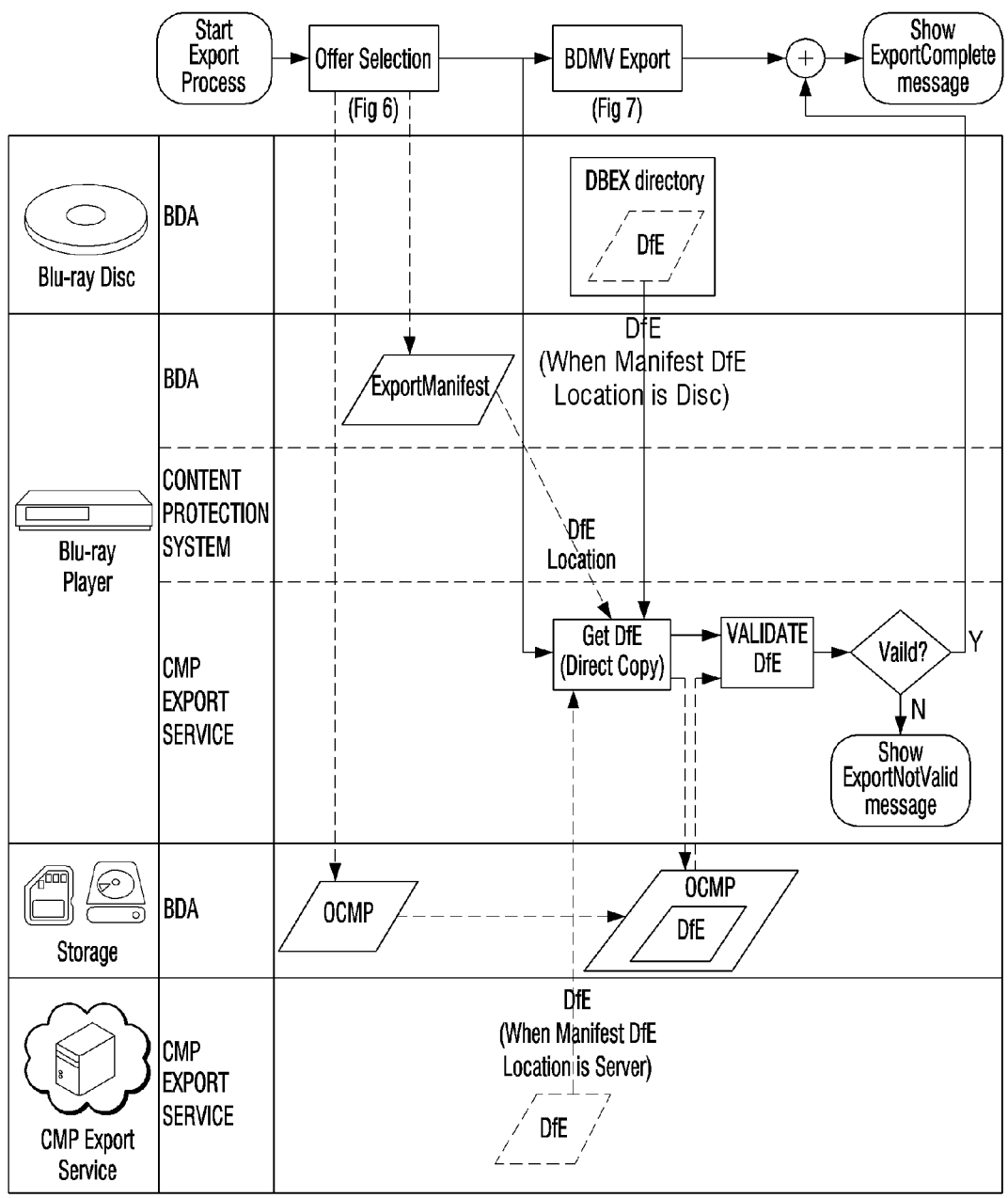
FIG. 8 is a diagram illustrating a data for export (DfE) Copy operation of a contents converting method according to an exemplary embodiment.

FIG. 8 is a diagram illustrating a DfE Copy operation of a contents converting method according to an exemplary embodiment. In FIG. 8, a solid line means a process progress, and a dashed line means a data transmission.

A contents converting apparatus or a Blu-ray player directly copies the DfE to a CMP file. This may be performed in parallel with a BDMV Export. The contents converting apparatus may acquire the DfE using the DfE positional or location information defined in the Export Manifest information. The DfE may be stored along with BDMV contents of a Blu-ray disc and in an URL supported in a server or a CMP export service.

The contents converting apparatus validates an integrity and an authenticity of the DfE that agrees with requirements defined in the server. If it is determined that an error occurs, the contents converting apparatus shows a message of contents that indicates that an export is not valid. The message is called 'ExportNotValid Message', and the contents of the message may be defined in the server.

After all of the operations of FIGS. 6A to 8 described above are performed, a message that indicates that contents conversion and export are completed is displayed.

Figure 9:
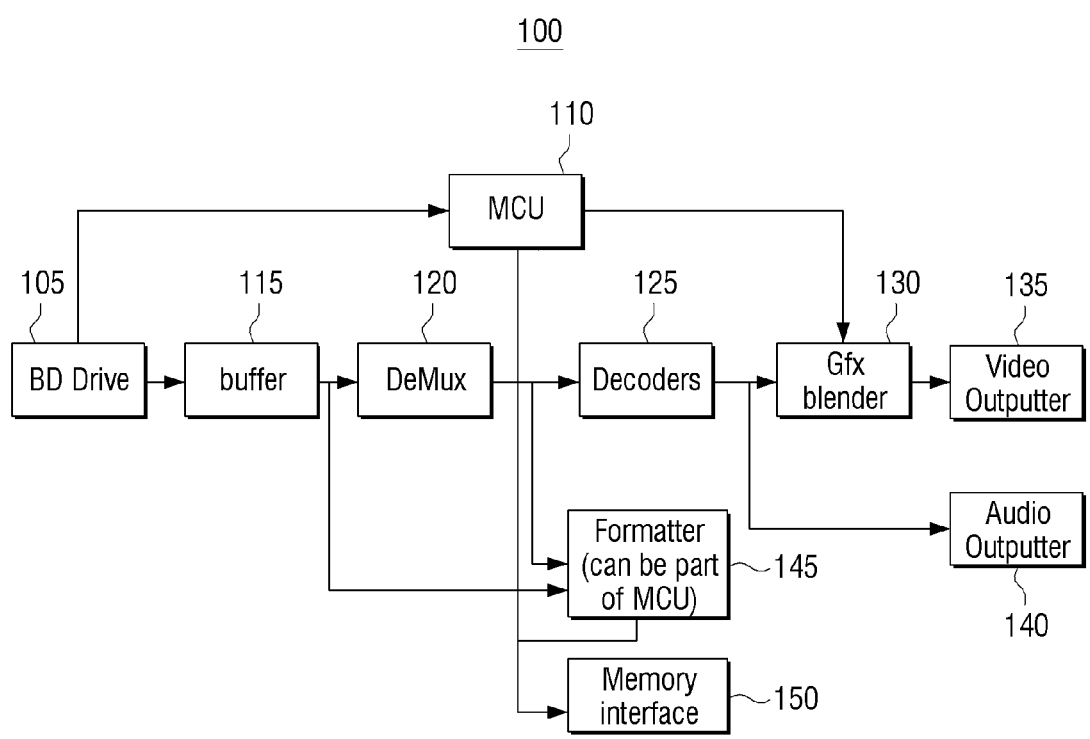
FIG. 9 is a block diagram illustrating a configuration of a contents converting apparatus according to an exemplary embodiment.

FIG. 9 is a block diagram illustrating a configuration of a contents converting apparatus 100 according to an exemplary embodiment. Referring to FIG. 9, the contents converting apparatus 100 includes a BD drive 105, a controller (MCU) 110, a buffer 115, a demultiplexer (DeMux) 120, decoders 125, a graphics (Gfx) blender 130, a video outputter 135, an audio outputter 140, a formatter 145, and a memory interface 150.

The BD drive 105, the MCU 110, the buffer 115, the DeMux 120, the decoders 125, the Gfx blender 130, the video outputter 135, and the audio outputter 140 are components that are included in a common Blu-ray player. Therefore, a description of these components will be omitted for conciseness.

The formatter 145 converts an individual stream demultiplexed in a file selected for a copy into a form to be stored in a final storage device, and encrypts the converted individual stream. For example, the formatter 145 may export the stream to be copied to generate new stream data.

Further, the formatter 145 may also have a demultiplexer function of exporting a plurality of streams from compound digital contents. In this case, the formatter 145 does not receive an input from the demultiplexer 120, but receives an input from the buffer 115.

The memory interface 150 may support, for example, an embedded storage device, a detachable storage device, a storage space connected to a network, and the like. The memory interface 150 may store the new stream data generated from the formatter 145 in an external storage unit, not in the contents converting apparatus 100 itself.

The MCU 110 controls components of the contents converting apparatus 100.

The controller 110 acquires manifest information of a data structure configuring contents, and determines the stream to be copied from the BD based on the acquired manifest information. Further, the controller 110 exports the stream to be copied from the BD by controlling the formatter 145 to generate the new stream data.

The controller 110 may acquire address information pre-stored in the BD, and acquire the manifest information from a server corresponding to the acquired address information. Further, the controller 110 may acquire a contents ID for content stored in the BD from the BD, and request the manifest information corresponding to the acquired contents ID from the server. As another example, the controller 110 may acquire the manifest information that is pre-stored in the BD. The manifest information may be stored in the server and the Blu-ray disc, respectively, and may also be separated, in which case a portion of the manifest information is stored in the server and another portion of the manifest information is stored in the BD. For example, when the manifest information is not stored in the BD, the controller 110 needs to acquire the manifest information from the server.

The controller 110 may control a display unit to display a plurality of offers that may be selected by the user based on the acquired manifest information. Further, the controller 110 may determine a stream corresponding to the offer selected by the user as the stream to be copied.

FIGS. 10A to 14B are diagrams illustrating a contents converting method according to exemplary embodiments.

Figure 10A:
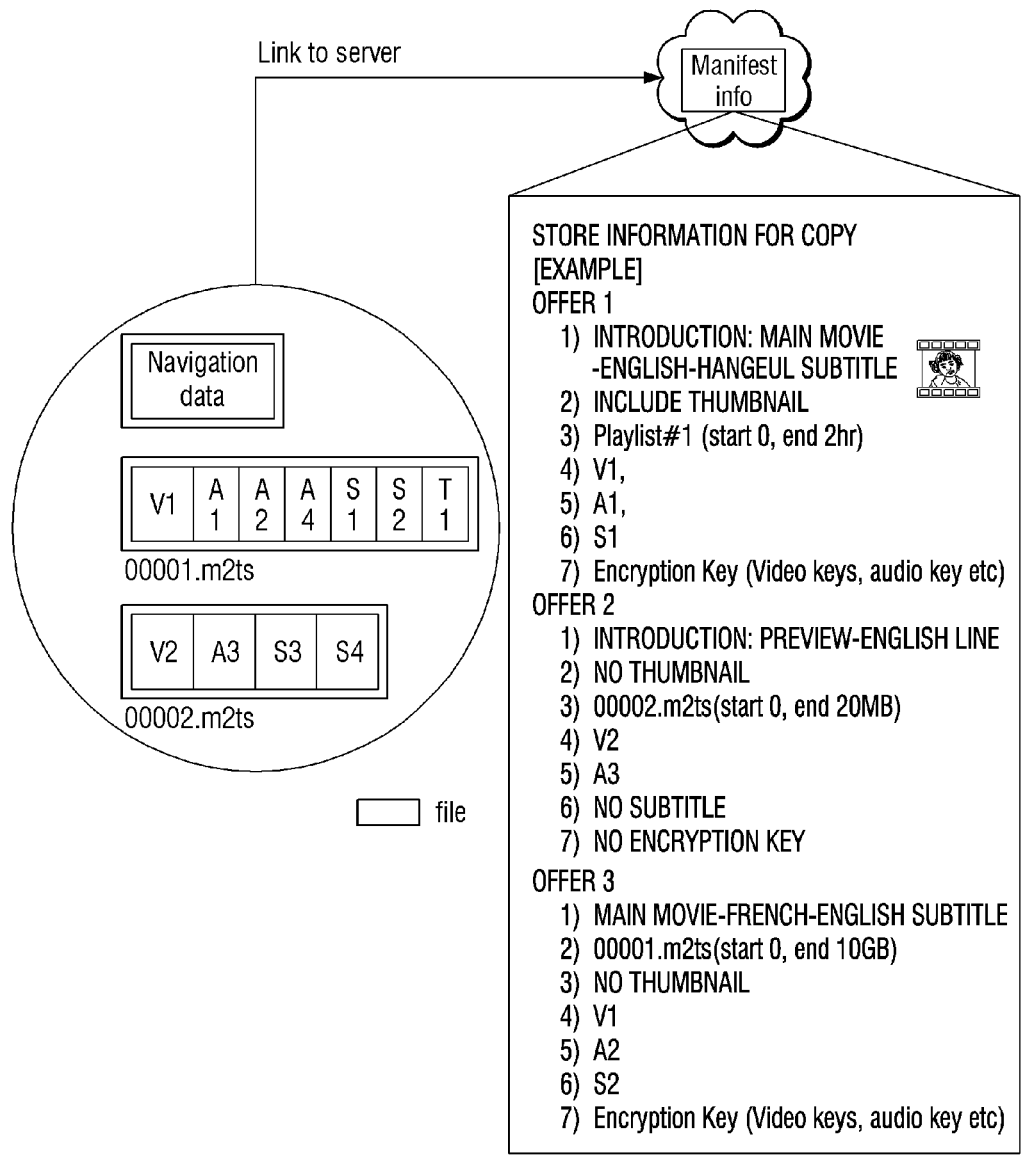
FIGS. 10A to 14B are diagrams illustrating a contents converting method according to exemplary embodiments.

FIG. 10A illustrates when manifest information is present in a server. In this case, 00001.m2ts and 00002.m2ts files that are compound data are present in a Blu-ray disc, and a navigation data for a method for playing the same is present in the Blu-ray disc. Further, the manifest information of a data structure is present in the server remote from the Blu-ray disc.

To connect the manifest information positioned at the server to the Blu-ray disc, the disc needs address information at which the manifest information is positioned, and the server needs contents ID information to allow a client to assort whether the currently requested manifest information is of what contents.

Therefore, a contents converting apparatus may first acquire the address information pre-stored in the Blu-ray disc, and acquire the manifest information from the server corresponding to the acquired address information. Further, the contents converting apparatus may acquire the contents ID for the contents stored in the Blu-ray disc from the Blu-ray disc, and request, from the server, the manifest information corresponding to the acquired contents ID to acquire the manifest information.

For example, the contents ID may be a unique numeral string that is used to encrypt the contents in the Blu-ray disc. Further, the contents ID may use a combination of several types of information that is recorded in the disc, or may be inserted into the navigation data in advance. The address information may be stored in the disc (for example, stored in the navigation data) in advance, or may also be stored in a non-volatile memory of the content converting apparatus in advance. FIG. 4 illustrates when the contents ID and the address information are stored in the navigation data. Therefore, the navigation data may be parsed to acquire the manifest information from the server.

The contents converting apparatus determines a stream to be copied based on the acquired manifest information. The manifest information includes information needed for a copy. The manifest information may include at least one of offer introduction information, copy information, and key information. The offer introduction information is information of the stream to be copied to the user. The offer introduction information may include an offer introduction character string, a thumbnail image for offer introduction, or positional information of an image. The copy information may include at least one of navigation information, stream information, positional information of a stream, and protocol information to be used to access the stream. For example, the copy information may include a Playlist (a playlist number or playlist information itself that is stored in the disc), which may be the navigation data, a time interval, stream information to be copied, and the like. As another example, the Playlist and the time interval may be substituted into a file name to be copied and a file pointer, and may be then used. Further, the key information is information used to protect the contents in a converting process. When an encryption key used for contents protection is stored in the disc, the encryption key becomes an object of a hacking attack, and therefore needs to be protected by being stored in the server so as not to be exposed.

FIG. 10A illustrates an example of the selectable offer that may be provided from the manifest information. For example, the user selecting offer 3 will be described. When the user selects the offer 3, the contents converting apparatus reads out a file by setting from 0 byte to 10 Gbytes of the 00001.m2ts file corresponding to the offer 3 as a copy scope. The contents converting apparatus commands a demultiplexer to select and output V1, A2, and S2 streams based on the manifest information of the offer 3. Further, the contents converting apparatus converts the V1, A2, and S2 streams into a file format (for example, an ISO file format) for storing the streams, stores the streams in the file format, and provides encryption keys. Therefore, new stream data including the V1, A2, and S2 streams are generated.

Figure 10B:
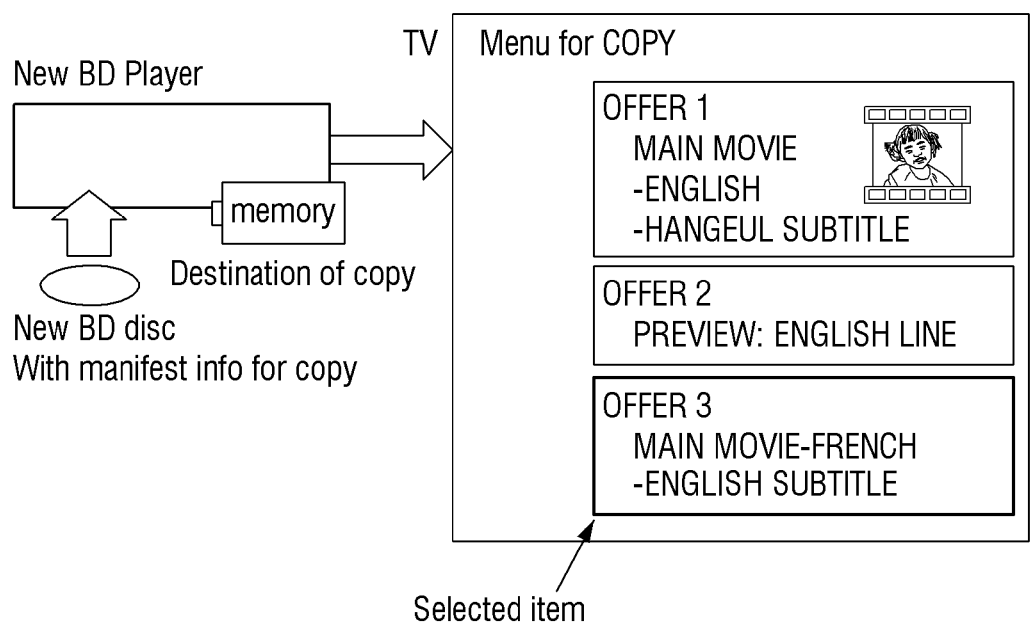

FIG. 10B is a diagram illustrating when the manifest information is displayed on a display unit by a displayed function of an UI that may be selected by the user. The contents converting apparatus displays an introduction portion that helps the user to select the offers displayed in the UI based on the manifest information. For example, when the user wants to export a movie file consisting of a French audio and an English subtitle, the user may select the offer 3.

Figure 10C:
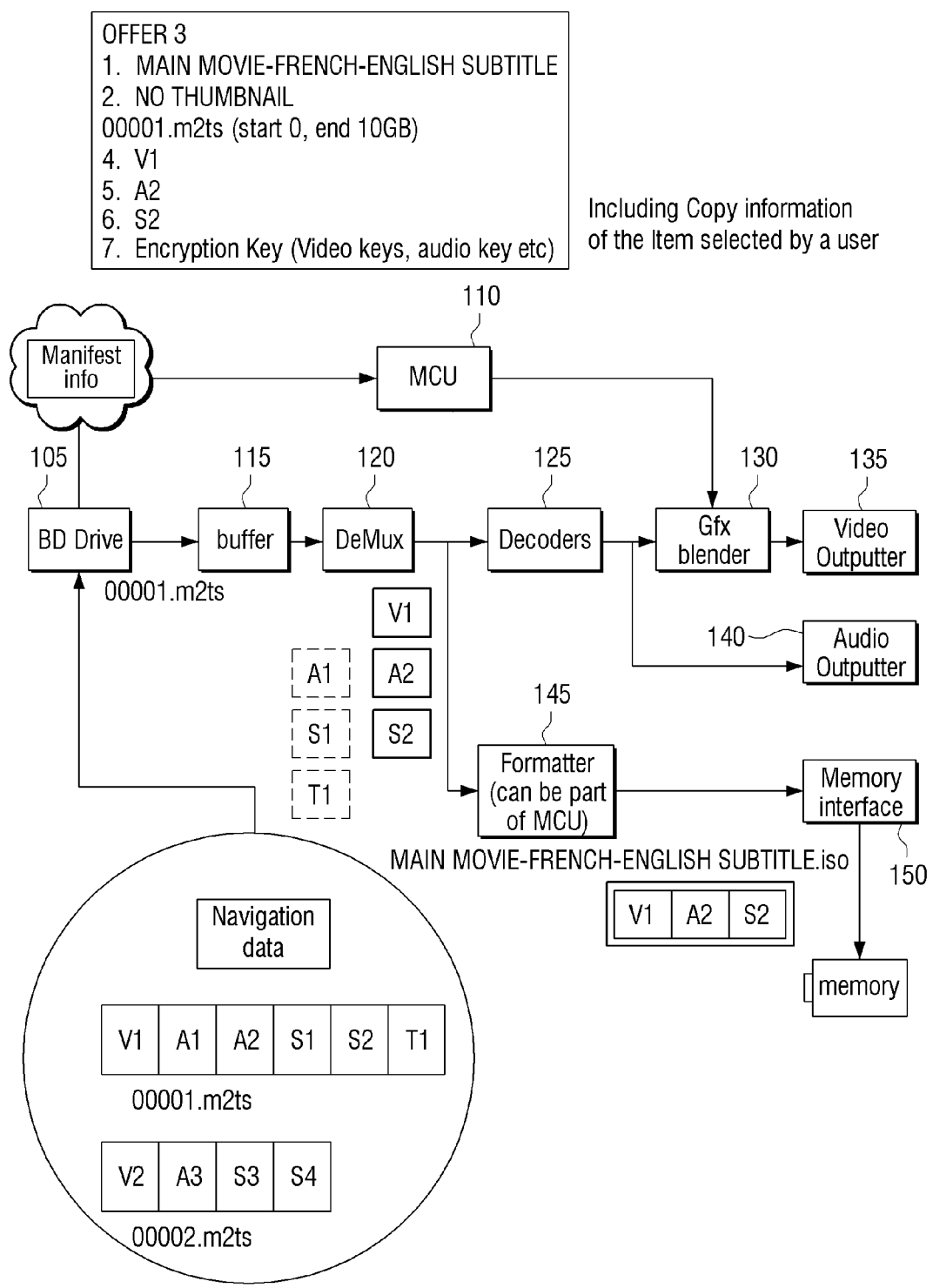

Further, FIG. 10C is a diagram illustrating at which of the respective components of the contents converting apparatus 100 of FIG. 9 the above-mentioned operation is executed. When the user selects the offer 3, the corresponding 00001.m2ts file is exported from the BD drive 105, and is stored in the buffer 115. The demultiplexer 120 demultiplexes the m2ts file to export the V1, A2, and S2 streams, and the like. The formatter 145 refers to the manifest information to generate a file of an iso format including the V1, A2, and S2 streams.

Figure 11A:
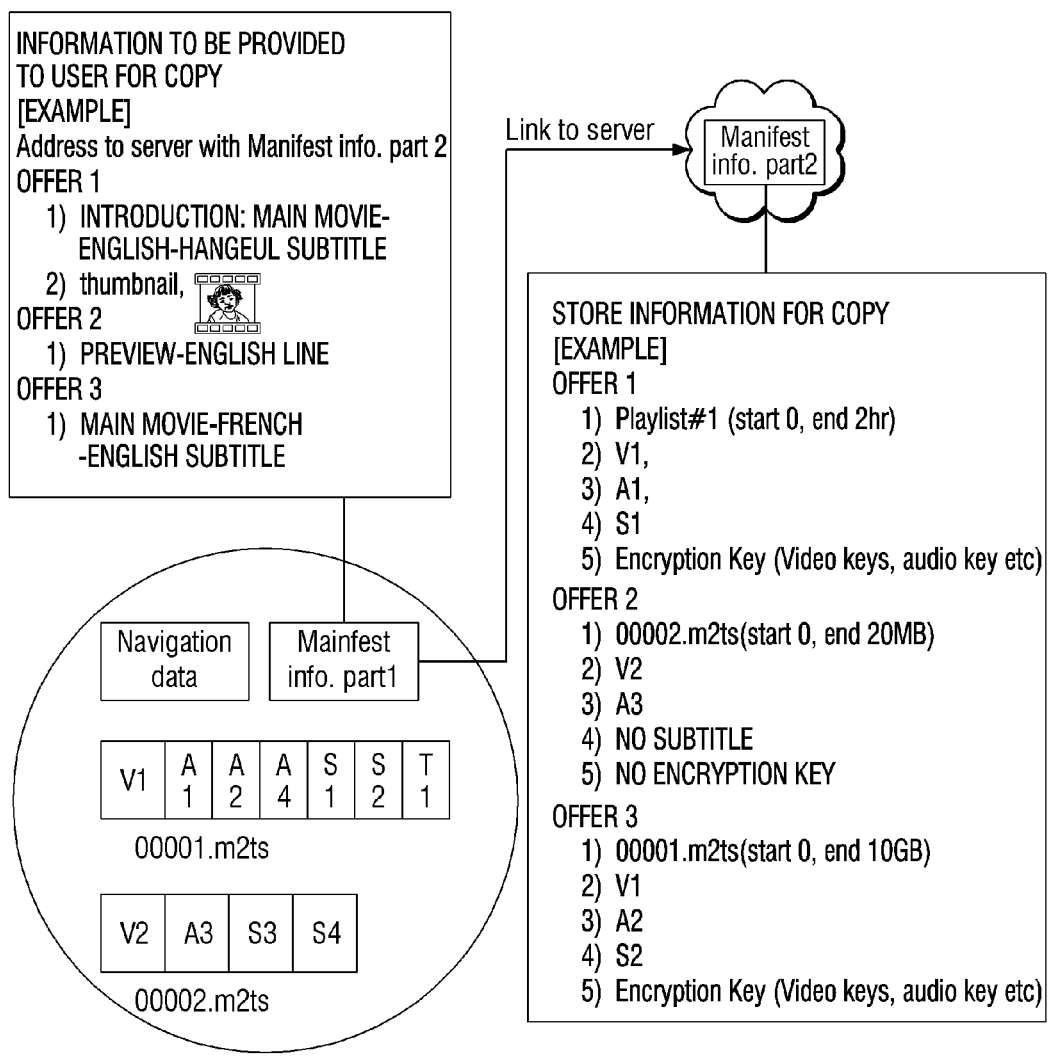
Figure 11B:
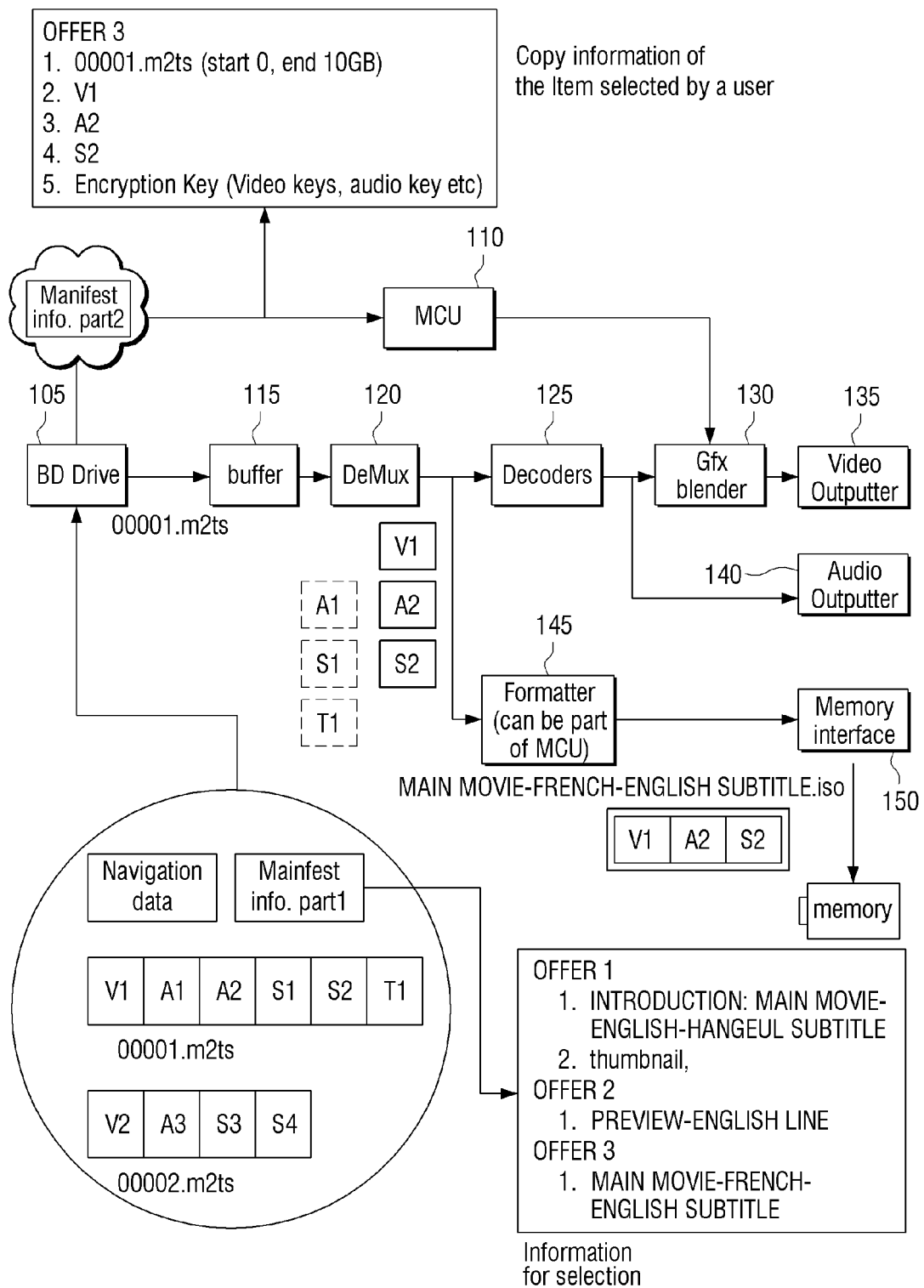

FIGS. 11A and 11B illustrate when manifest information is separately present in the Blu-ray disc and the server. In this case, the manifest information may be divided into manifest info part 1 provided to enable a user to select contents to be copied and stored in the Blu-ray disc, and manifest info part 2 needed to enable a copy performing apparatus to perform a copy and stored in the server. For example, the key information included in the manifest information may be stored in the server, not in the disc, for security. Except for the fact that the manifest information is split and stored at different positions, the contents converting method described with reference to FIG. 11 performs a contents conversion and export process by an operation corresponding to the one described with reference to FIG. 10.

Figure 12:
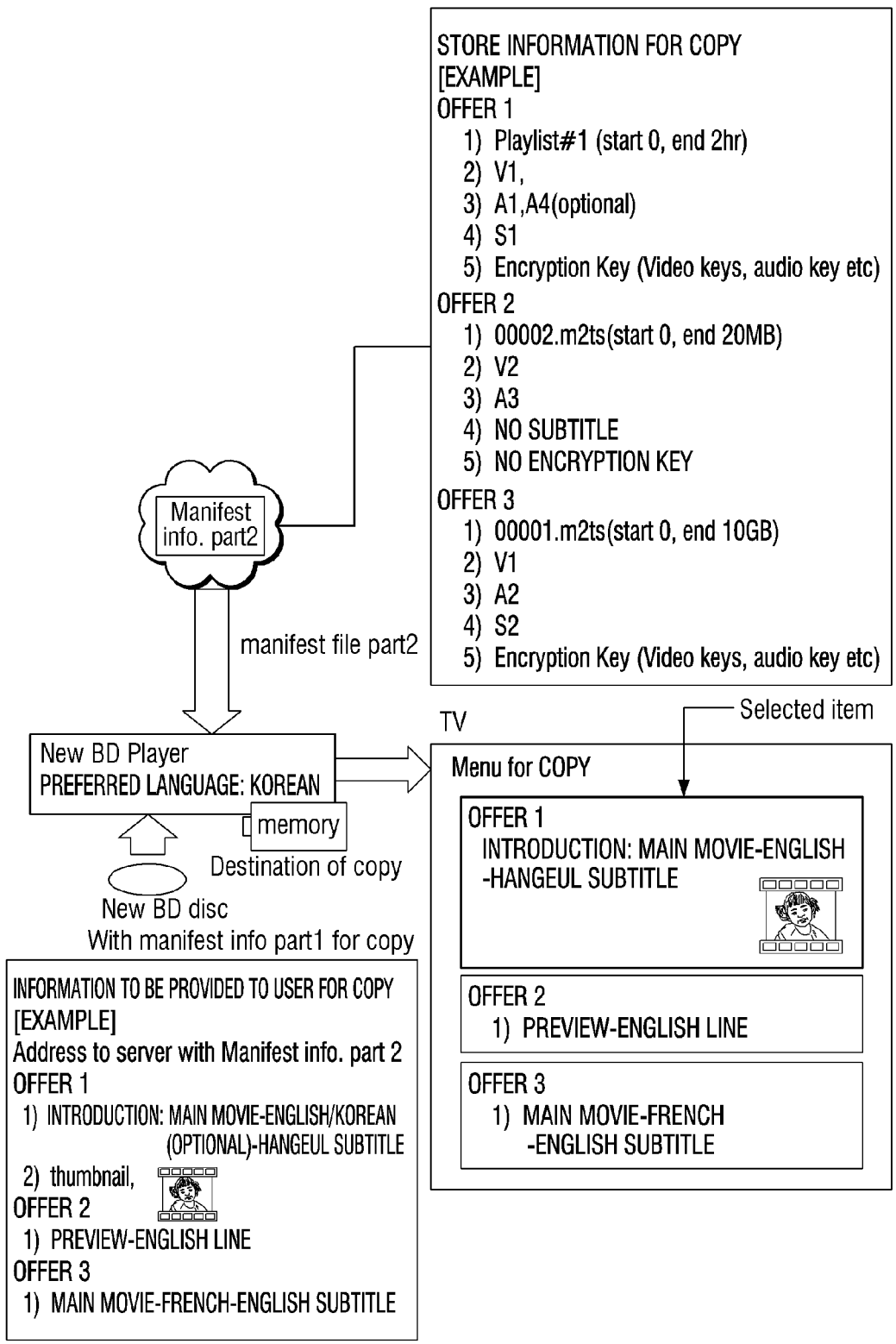

FIG. 12 is a diagram illustrating an example of additionally providing copy priority information. The copy priority information may be included in manifest information as information representing a priority depending on a user preference. Further, the user preference and contents business intention may also be reflected. In FIG. 12, Korean among two audios (English and Korean) of an offer 1 is declared as an option. Therefore, when a contents converting apparatus makes an elementary menu for TV, if a copy ability of the contents converting apparatus may copy only a single audio, only English needs to be output to a menu as illustrated in FIG. 12. In this case, a modified menu that may modify the audio is not displayed. However, if the copy ability of the contents converting apparatus may output two streams, two language options (English and Korean) may be displayed in the elementary menu.

The priority information may be represented by a number increasing from 1 (highest priority), but may be displayed using an optional flag that informs that a stream is an optionally copied, or a mandatory flag that informs that the stream is necessarily copied. Referring to FIG. 12, the menu is output to a TV, while the Korean stream represented as optional is excluded from the offer 1 of a manifest info part 1 stored in a disc, and the English audio stream may be copied.

Figure 13A:
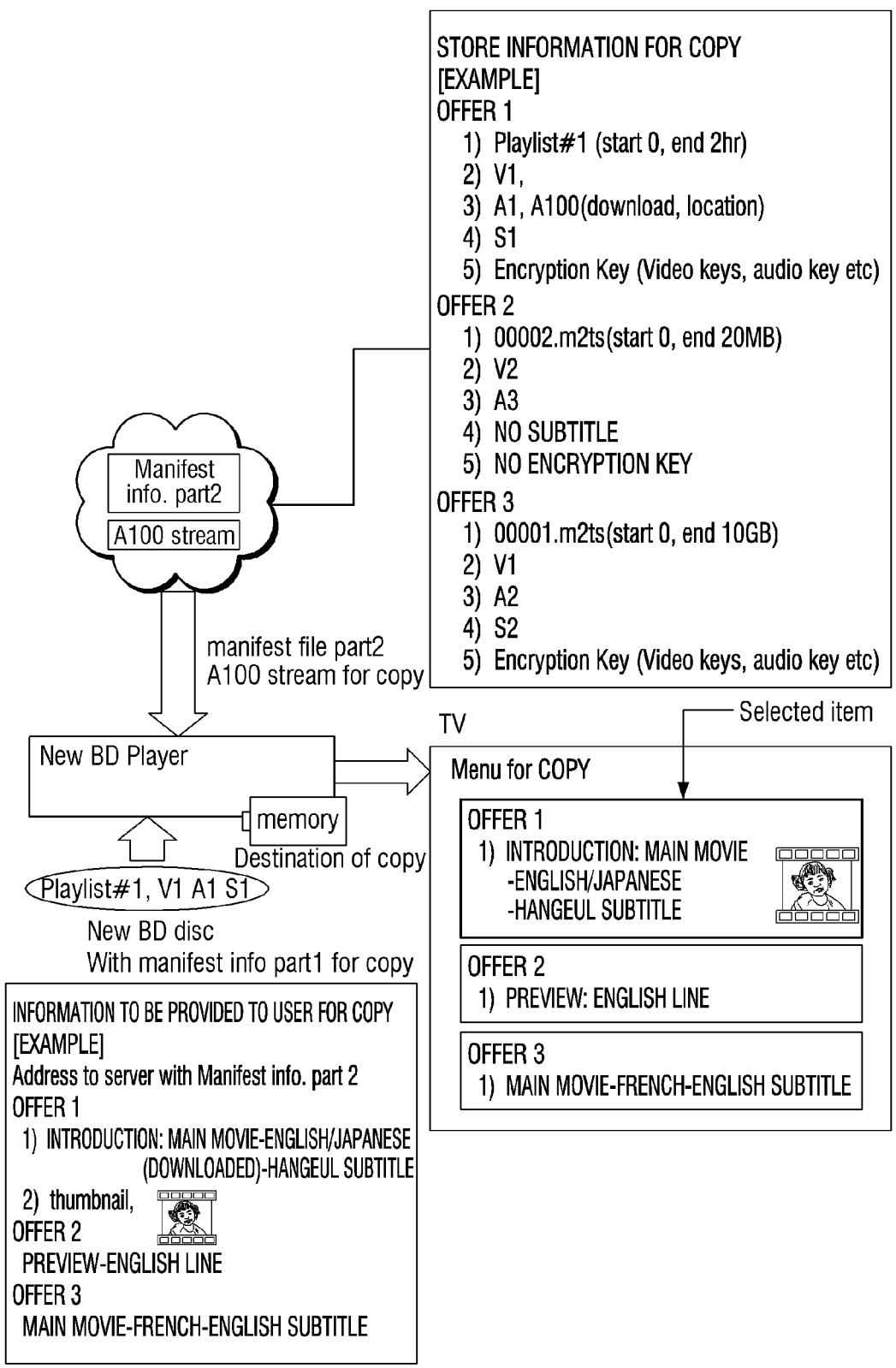
Figure 13B:
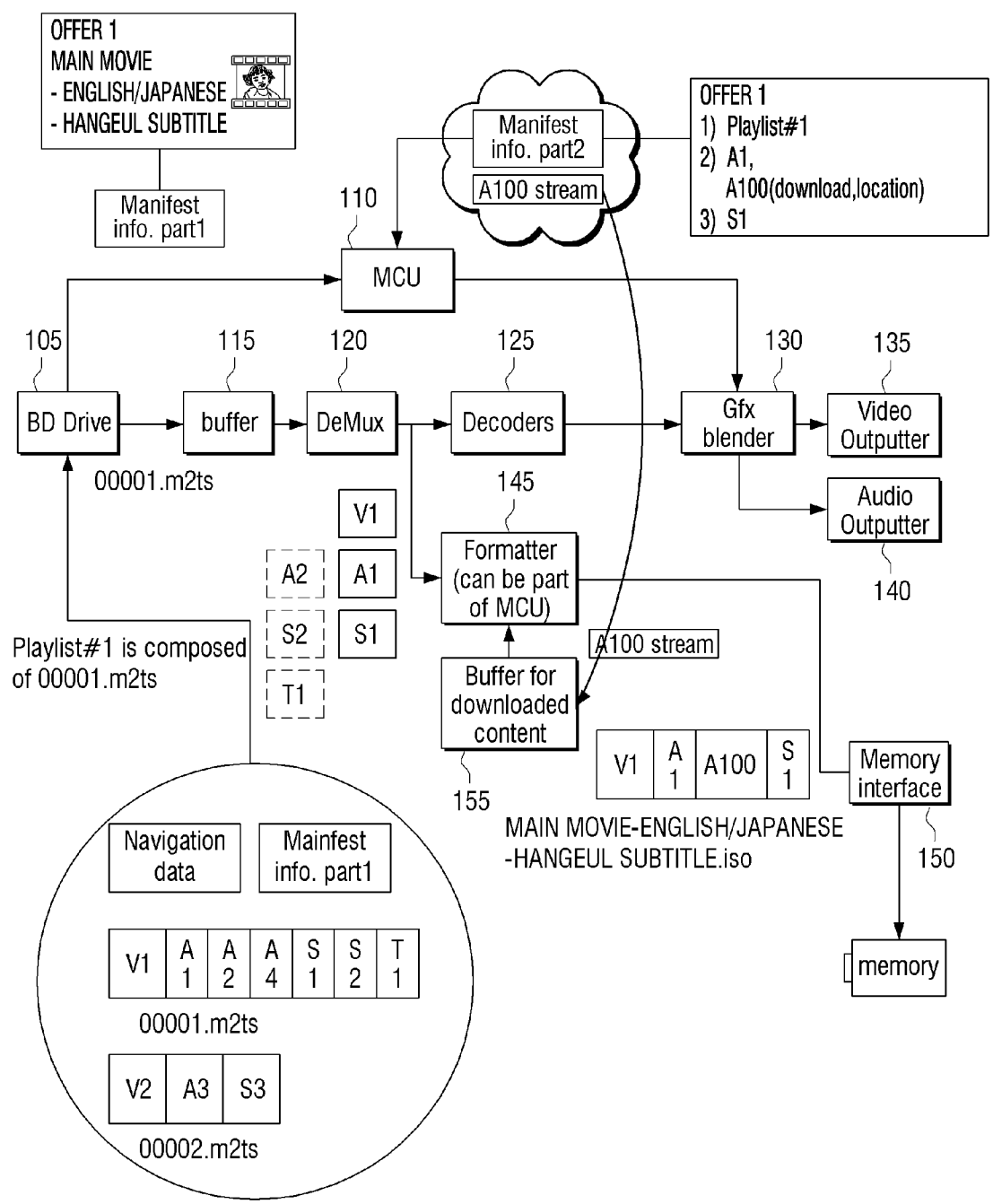

FIGS. 13A and 13B are diagrams illustrating when a separate stream that is not present in the Blu-ray disc is downloaded to generate a new data stream along with contents that are present in the disc. A contents converting apparatus may combine an exported stream to be copied with a data stream received from a server to generate the new data stream. For example, the data stream received from the server may be at least one of a subtitle, a video, an audio, and a text.

Referring to FIGS. 13A and 13B, a Japanese audio stream is downloaded from a separate server, and thus is included in the stream generated together. As such, a user exports a video from the released Blu-ray disc, and separately may download a subtitle or an audio stream for a language newly provided to generate the new data stream. In this case, as illustrated in FIG. 13B, a buffer 155 for separate download content is provided. The buffer 155 is provided as a download speed from the Internet may be slower than a speed of reading a stream from the disc, and therefore the download needs to be completed prior to reading the stream from the disc.

Figure 14A:
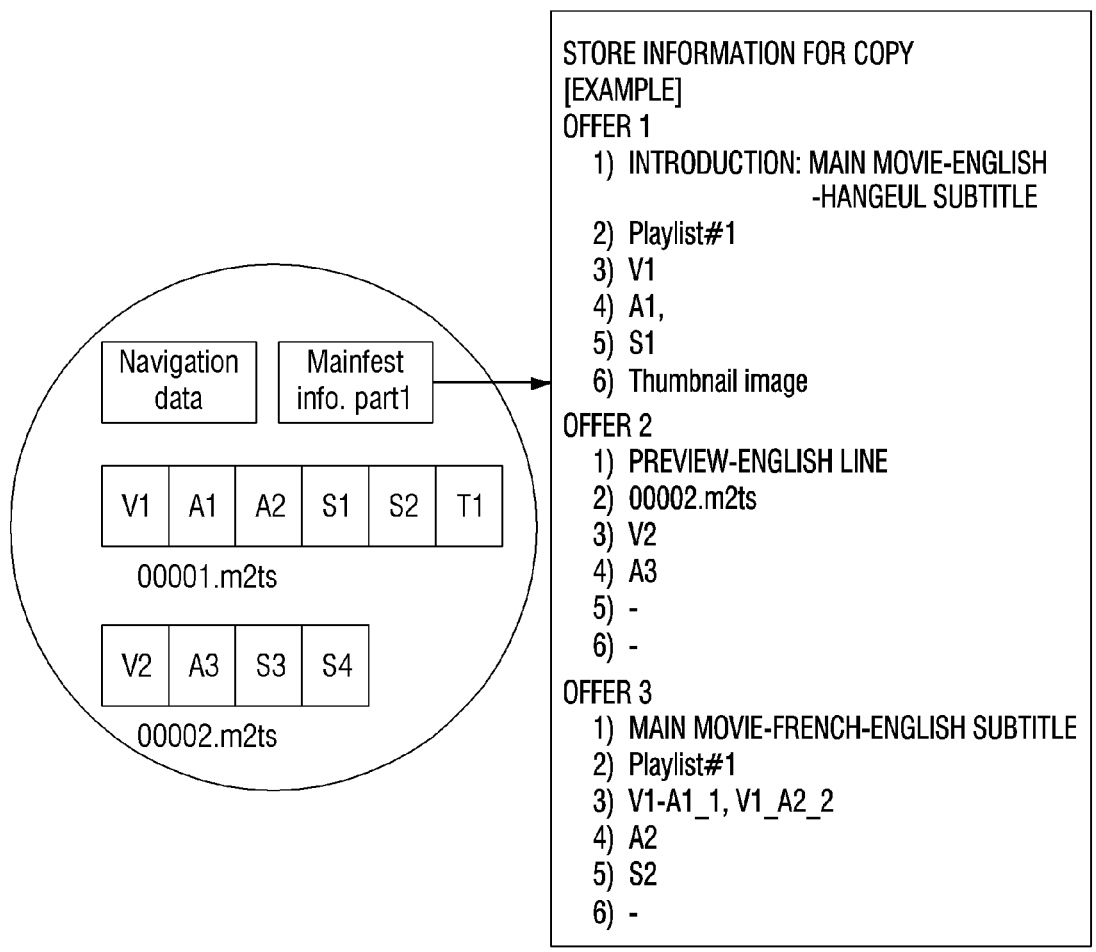
Figure 14B:
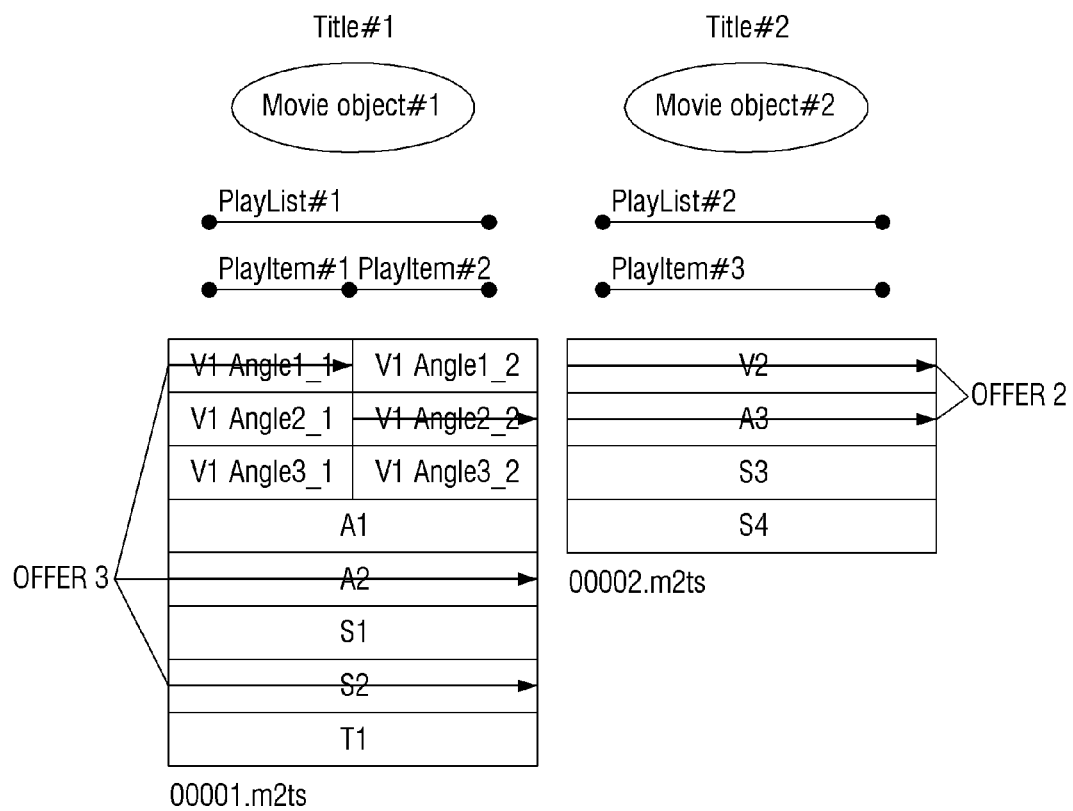

FIGS. 14A and 14B illustrate a case of a multi angle. For example, if a video is a multi angle video that has several angles, angles to be copied may be designated one by one. An angle in a multi angle stream may be changed for each PlayItem. Therefore, in the case of copying compound digital contents including the multi angle using a Playlist, a number of an angle to be copied is present as many as a number of PlayItems.

According to various exemplary embodiments as described above, a user may easily propagate high quality contents stored in a Blu-ray disc through a network or a mobile memory. Further, it is possible to play encrypted high quality contents in various digital ecosystems.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A contents converting apparatus for converting contents comprising a plurality of compound data files stored in an optical disc, the contents converting apparatus comprising:
   a formatter configured to convert stream data of a first format to stream data of a second format;
   a demultiplexer configured to select and output stream data from a compound data file, the compound data file comprising a plurality of stream data; and
   a controller configured:
   to receive manifest information including a plurality of offers which allow a user to select a stream data to be copied, each offer defining a corresponding stream data to be copied, to output the offers, in response to an offer among the output offers being selected, to determine a stream data to be copied which is corresponding to the selected offer, to control the demultiplexer to export at least one portion of the determined stream data based on position information associated the determined stream data comprised in the selected offer, and to control the formatter to convert the extracted at least one portion of the determined stream data of the first format to stream data of the second format.

2. The contents converting apparatus as claimed in claim 1, wherein the controller is configured to:
   receive address information from the optical disc; and
   receive the manifest information from a server corresponding to the address information.

3. The contents converting apparatus as claimed in claim 1, wherein the controller is configured to:
   receive a contents identifier (ID) of the contents stored in the optical disc from the optical disc; and
   receive the manifest information corresponding to the contents ID from a server.

4. The contents converting apparatus as claimed in claim 1, wherein the controller is configured to receive the manifest information from the optical disc.

5. The contents converting apparatus as claimed in claim 1, further comprising:
   a display unit configured to display a screen,
   wherein the controller is configured to control the display unit to display one or more offers to convert the respective plurality of stream data based on the manifest information, and determine a stream data corresponding to a selection of one of the one or more offers as the stream data to be copied.

6. The contents converting apparatus as claimed in claim 1, wherein the second format comprises an International Organization for Standardization base media file format definition file or a media extraction table.

7. The contents converting apparatus as claimed in claim 1, wherein the formatter is further configured to encrypt the stream data of the second format.

8. The contents converting apparatus as claimed in claim 1, wherein the formatter is configured to combine the determined stream data with stream data received from a server to generate the stream data of the second format.

9. A contents converting method for converting contents comprising a plurality of stream data stored in an optical disc, the contents converting method comprising:
   receiving manifest information including a plurality of offers which allow a user to select a stream data to be copied, each offer defining a corresponding stream data to be copied;
   outputting the offers;
   determining a stream data to be copied which is corresponding to the selected offer, in response to an offer among the output offers being selected;
   exporting at least one portion of the determined stream data based on position information associated the determined stream data comprised in the selected offer; and
   converting the extracted at least one portion of the determined stream data of the first format to stream data of the second format.

10. The contents converting method as claimed in claim 9, wherein the receiving comprises:
    receiving address information from the optical disc; and
    receiving the manifest information from a server corresponding to the address information.

11. The contents converting method as claimed in claim 9, wherein the receiving comprises:
    receiving a contents identifier (ID) of the contents stored in the optical disc from the optical disc; and
    receiving the manifest information corresponding to the contents ID from a server.

12. The contents converting method as claimed in claim 9, wherein the receiving comprises receiving the manifest information from the optical disc.

13. The contents converting method as claimed in claim 9, wherein the determining comprises:
    displaying one or more offers to convert the respective plurality of stream data based on the manifest information; and
    determining a stream data corresponding to a selection of one of the one or more offers as the stream data to be copied.

14. The contents converting method as claimed in claim 9, wherein of the second format comprises an International Organization for Standardization base media file format definition file or a media extraction table.

15. The contents converting method as claimed in claim 9, further comprising:
    encrypting the stream data of the second format.

16. The contents converting method as claimed in claim 9, wherein the manifest information comprises any one or any combination of offer introduction information of the stream data to be copied, key information to be used to encrypt the stream data to be copied, and copy information, and
    the copy information comprises any one or any combination of navigation information, stream information, positional information of stream data, and protocol information to be used to access the stream data.

17. The contents converting method as claimed in claim 9, wherein the manifest information comprises copy priority information indicating a priority based on a user preference.

18. The contents converting method as claimed in claim 9, wherein the converting comprises combining the determined stream data with stream data received from a server to generate the stream data of the second format.

19. The contents converting method as claimed in claim 18, wherein the stream data received from the server is any one or any combination of a subtitle, a video, an audio, and a text.

20. A non-transitory computer readable recording medium storing a program for executing a contents converting method for converting contents consisting of a plurality of stream data stored in a optical disk, wherein the contents converting method includes:

receiving manifest information including a plurality of offers which allow a user to select a stream data to be copied, each offer defining a corresponding stream data to be copied;

outputting the offers;

determining a stream data to be copied which is corresponding to the selected offer, in response to an offer among the output offers being selected;

exporting at least one portion of the determined stream data based on position information associated the determined stream data comprised in the selected offer; and converting the extracted at least one portion of the determined stream data of the first format to stream data of the second format.

21. The contents converting apparatus as claimed in claim 1, wherein the controller controls the demultiplexer to export another portion of the determined stream data, and merges the at least one portion of the determined stream data and the exported another potion of the determined stream data.

\* \* \* \* \*